United States Patent
Davare et al.

(10) Patent No.: US 10,622,911 B1
(45) Date of Patent: Apr. 14, 2020

(54) RECTIFIER CIRCUITS FOR ELECTRICAL POWER SUPPLIES

(71) Applicant: Astec International Limited, Kwun Tong, Kowloon (HK)

(72) Inventors: Rahul Vinaykumar Davare, Eden Prairie, MN (US); Robert Henry Kippley, Eagan, MN (US)

(73) Assignee: Astec International Limited, Kwun Tong, Kowloon (HK)

( * ) Notice: Subject to any disclaimer, the term of this patent is extended or adjusted under 35 U.S.C. 154(b) by 52 days.

(21) Appl. No.: 16/207,897

(22) Filed: Dec. 3, 2018

(51) Int. Cl.
  *H02M 7/219* (2006.01)
  *H02M 7/217* (2006.01)

(52) U.S. Cl.
  CPC ......... *H02M 7/219* (2013.01); *H02M 7/2176* (2013.01); *H02M 2007/2195* (2013.01)

(58) Field of Classification Search
  CPC ........ H02M 7/06; H02M 7/068; H02M 7/217; H02M 7/219; H02M 7/2176; H02M 3/33523; H02M 3/33562; H02M 3/33592; H02M 2007/2195; Y02B 70/126; Y02B 70/1408; Y02B 70/1466; Y02B 70/1475; H01F 27/40

USPC ... 363/84, 89, 123, 125, 126, 127, 128, 136, 363/147, 157, 163, 181; 323/268, 271, 323/906
  See application file for complete search history.

(56) References Cited

U.S. PATENT DOCUMENTS

| | | | | |
|---|---|---|---|---|
| 5,510,972 A | * | 4/1996 | Wong | H02M 7/219 363/125 |
| 6,366,485 B1 | * | 4/2002 | Fujisawa | G04C 10/00 363/127 |
| 2006/0267561 A1 | * | 11/2006 | Domb | G05F 1/70 323/222 |
| 2010/0309701 A1 | * | 12/2010 | Wu | H02M 3/33592 363/127 |

* cited by examiner

Primary Examiner — Yemane Mehari
(74) Attorney, Agent, or Firm — Harness, Dickey & Pierce, P.L.C.

(57) ABSTRACT

A rectifier circuit for a power supply includes a diode bridge, a first metal-oxide-semiconductor field-effect transistor (MOSFET) and a second MOSFET each coupled in parallel with corresponding diodes of the diode bridge to reduce losses associated with bridge diode voltage drops and increase conversion efficiency. A self-driven driver circuit is coupled for controlling switching operation of the first MOSFET and the second MOSFET to operate the first MOSFET and the second MOSFET as high-side floating synchronous rectifiers. Methods of supplying power via a rectifier circuit of a power supply are also described.

23 Claims, 16 Drawing Sheets

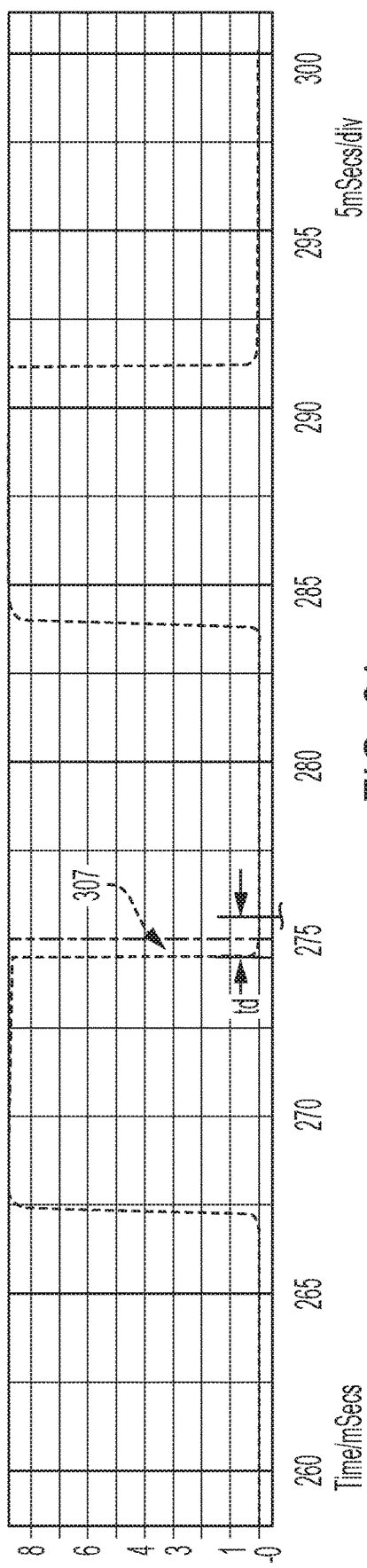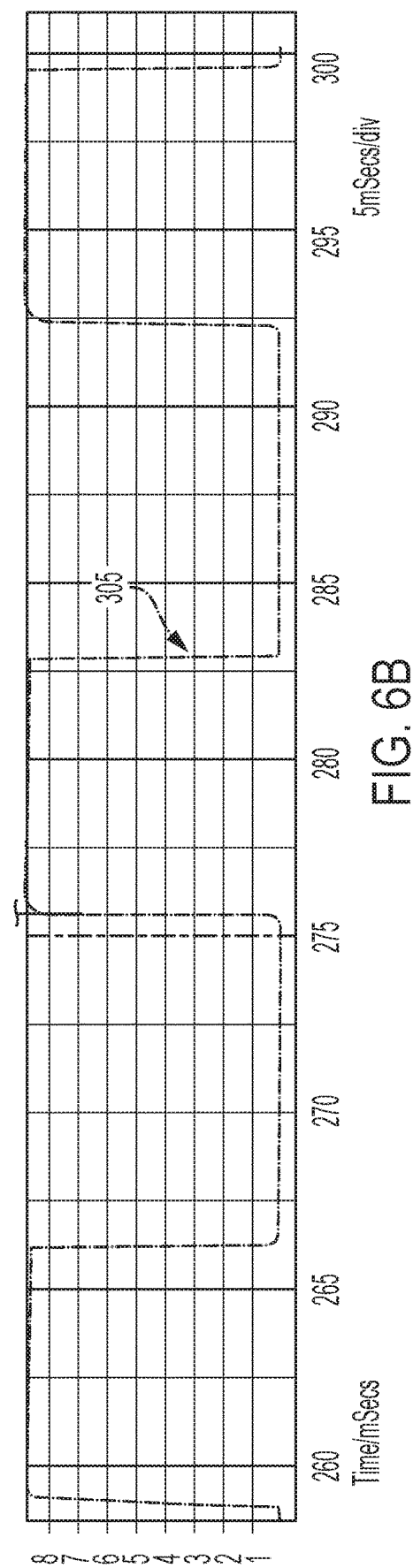
FIG. 6A
FIG. 6B

RECTIFIER CIRCUITS FOR ELECTRICAL POWER SUPPLIES

FIELD

The present disclosure relates to rectifier circuits for electrical power supplies.

BACKGROUND

This section provides background information related to the present disclosure which is not necessarily prior art.

In power supplies where a bridge rectifier is used to correct polarity or convert alternating current (AC) to direct current (DC), the bridge diodes introduce voltage drops and associated losses. Some power supplies use a metal-oxide semiconductor field-effect transistor (MOSFET) bridge across the existing bridge rectifier to reduce the losses associated with bridge diode voltage drops and increase conversion efficiency.

SUMMARY

This section provides a general summary of the disclosure, and is not a comprehensive disclosure of its full scope or all of its features.

According to one aspect of the present disclosure, a rectifier circuit for a power supply includes a line input and a neutral input for receiving an AC input voltage, and a diode bridge coupled between the line input and the neutral input for outputting a rectified voltage. The diode bridge includes multiple diodes. The rectifier circuit also includes a first metal-oxide-semiconductor field-effect transistor (MOSFET) coupled in parallel with a first one of the multiple diodes, and a second MOSFET coupled in parallel with a second one of the multiple diodes. The first and second MOSFETs each include a gate. The rectifier circuit also includes a self-driven driver circuit coupled between the line input and the gate of the first MOSFET, and between the neutral input and the gate of the second MOSFET, for controlling switching operation of the first MOSFET and the second MOSFET during corresponding half-cycles of the AC input voltage according to a line frequency and polarity of the AC input voltage, to operate the first MOSFET and the second MOSFET as high-side floating synchronous rectifiers.

According to another aspect of the present disclosure, a rectifier circuit for a power supply includes a line input and a neutral input for receiving an AC input voltage, and a diode bridge coupled between the line input and the neutral input for outputting a rectified voltage. The diode bridge includes multiple diodes. The rectifier circuit also includes a metal-oxide-semiconductor field-effect transistor (MOSFET) coupled in parallel with a first one of the multiple diodes, with the MOSFET including a gate. The rectifier circuit further includes a self-driven driver circuit coupled between a gate of the MOSFET and the line input or the neutral input, for controlling switching operation of the MOSFET during a half-cycle of the AC input voltage according to a line frequency and polarity of the AC input voltage, to operate the MOSFET as a high-side floating synchronous rectifier, the self-driven driver circuit including a transistor coupled between the gate of the MOSFET and the line input, the neutral input or an electrical ground.

According to another aspect of the present disclosure, a method of supplying power via a rectifier circuit of a power supply is disclosed. The rectifier circuit includes a line input and a neutral input for receiving an AC input voltage, and a diode bridge coupled to the line input and the neutral input. The diode bridge includes multiple diodes. The rectifier circuit also includes a first metal-oxide-semiconductor field-effect transistor (MOSFET) coupled in parallel with a first one of the four diodes, a second MOSFET coupled in parallel with a second one of the four diodes, and a self-driven driver circuit coupled between the line input and a gate of the first MOSFET, and between the neutral input and a gate of the second MOSFET. The method includes controlling, by the self-driven driver circuit, switching operation of the first MOSFET during a first half-cycle of the AC input voltage according to a line frequency and polarity of the AC input voltage, to operate the first MOSFET as a high-side floating synchronous rectifier. The method also includes controlling, by the self-driven driver circuit, switching operation of the second MOSFET during another half-cycle of the AC input voltage according to the line frequency and polarity of the AC input voltage, to operate the second MOSFET as a high-side floating synchronous rectifier.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 6A-6D are line graphs illustrating example voltage and current waveforms of the rectifier circuit of FIG. 5.

Corresponding reference numerals indicate corresponding parts or features throughout the several views of the drawings.

DETAILED DESCRIPTION

Figure 1:
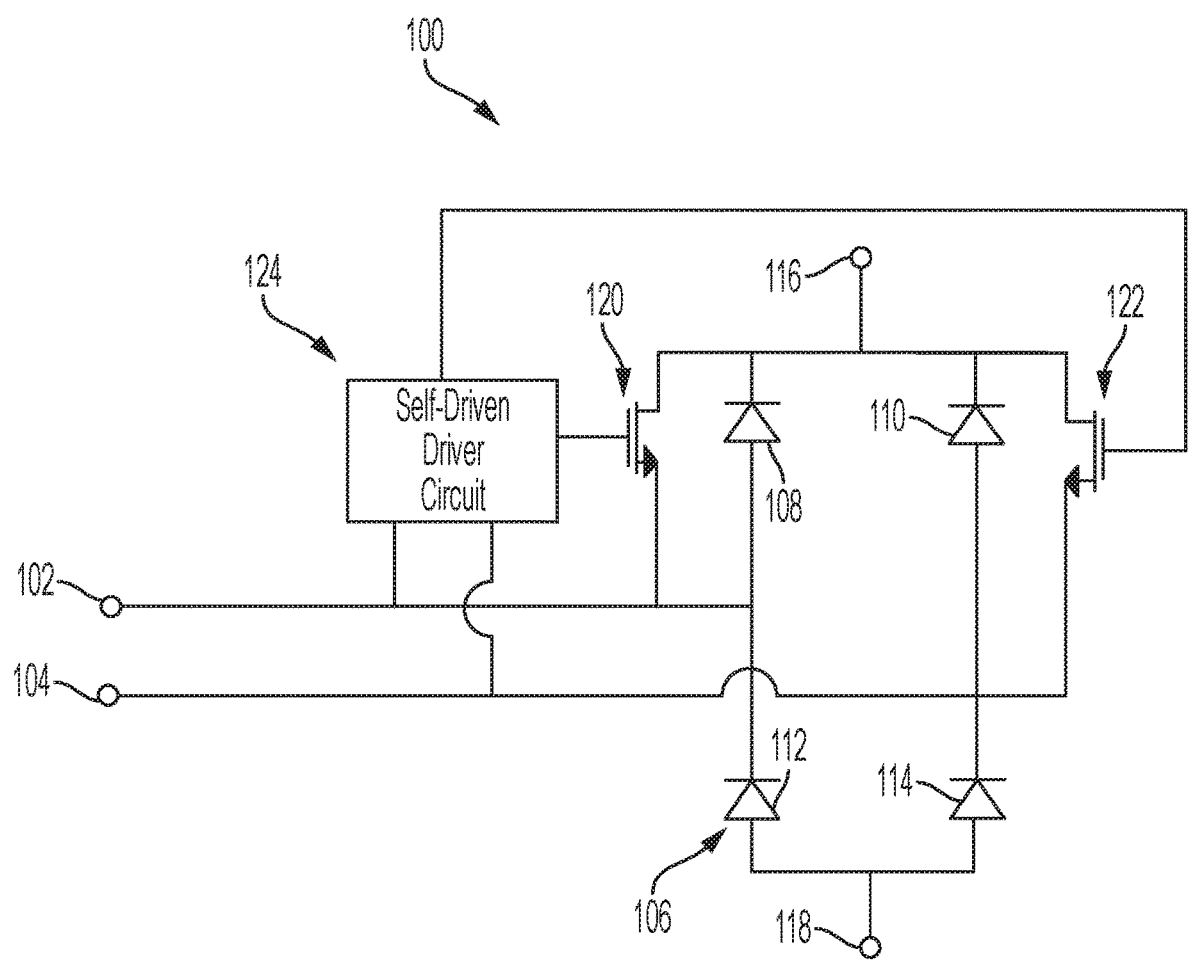
FIG. 1 is a schematic diagram of rectifier circuit for a power supply, according to one example embodiment of the present disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Example embodiments will now be described more fully with reference to the accompanying drawings.

An improved diode bridge rectifier circuit for a power supply according to one example embodiment of the present disclosure is illustrated in FIG. 1 and indicated generally by reference number 100. The rectifier circuit 100 includes a line input 102 and a neutral input 104 for receiving an input voltage (e.g., from an AC voltage source, etc.).

The rectifier circuit 100 also includes a diode bridge 106 coupled to the line input 102 and the neutral input 104 (e.g., to receive the AC input), and output a rectified voltage. As shown in FIG. 1, the diode bridge 106 includes four diodes 108, 110, 112 and 114, although other embodiments could include more or less diodes.

The rectifier circuit 100 includes two metal-oxide-semiconductor field-effect transistors (MOSFETs) 120 and 122, which may be considered as high-side (e.g., top-side) floating synchronous rectifiers. For example, if the voltage output 118 is adapted to provide a positive rectified output voltage and the voltage output 116 is coupled with an electrical ground, the MOSFETs 120 and 122 may be considered as high-side floating synchronous rectifiers because the MOSFETs 120 and 122 are not connected to an electrical ground. The MOSFET 120 is coupled in parallel with the diode 108, and the MOSFET 122 is coupled in parallel with the diode 110. Each MOSFET 120 and 122 includes a gate, a source and a drain.

The improved rectifier circuit 100 provides an improvement by including a self-driven driver circuit 124 for controlling the MOSFETs 120 and 122 according to the AC input voltage (e.g., where the self-driven driver circuit 124 does not include a controller, a microprocessor, etc.).

The self-driven driver circuit 124 is coupled between the line input 102 and the gate of the first MOSFET 120, and between the neutral input 104 and the gate of the second MOSFET 122. The self-driven driver circuit 124 is arranged for controlling switching operation of the first MOSFET 120 and the second MOSFET 122 during corresponding half-cycles of the AC input voltage according to a line frequency and polarity of the AC input voltage, to operate the first MOSFET 120 and the second MOSFET 122 as high-side floating synchronous rectifiers.

For example, and as explained further below, the self-driven driver circuit 124 may include a transistor coupled between the line input 102 and the gate of the MOSFET 120 to control switching operation of the MOSFET 120 according to the received AC input voltage, and another transistor coupled between the neutral input 104 and the gate of the MOSFET 122 to control switching operation of the MOSFET 122 according to the received AC input voltage.

The diode bridge 106 may correct a polarity of the input voltage received at the line input 102 and the neutral input, may convert an alternating current (AC) voltage into a direct current (DC) voltage, etc., and may output the rectified voltage via two voltage outputs 116 and 118. For example, voltage output 116 may supply a positive rectified voltage, voltage output 118 may supply a negative rectified voltage or be connected to an electrical ground, etc. In other embodiments, the diode bridge 106 may output the rectified voltage via more or less outputs, with different relative positive or negative output voltage values or polarities, etc.

As shown in FIG. 1, the diode 108 is coupled between the line input 102 and the voltage output 116, the diode 110 is coupled between the neutral input 104 and the voltage output 116, the diode 112 is coupled between the line input 102 and the voltage output 118, and the diode 114 is coupled between the neutral input 104 and the voltage output 118. The line input 102, neutral input 104, and voltage outputs 116 and 118 may include any suitable terminal, pin, wire, electrical connector, etc.

The MOSFETs 120 and 122 can improve conversion efficiency of the rectifier circuit 100 by reducing power losses across the bridge diode drops of the diodes 108 and 110. For example, the MOSFETs 120 and 122 may operate in a self-driven (e.g., autonomous) mode of operation without receiving an external drive signal from a controller, because switching operation of the MOSFETs is controlled by the self-driven driver circuit 124.

The rectifier circuit 100 may reduce circuit complexity, parts count, cost, etc., while driving and/or controlling the MOSFETs 120 and 122 according to a line voltage frequency and polarity. In some embodiments, the rectifier circuit 100 may increase efficiency during discontinuous current operation for power factor correction, may increase efficiency by reducing power loss in the diodes 108 and 110 during operation at half load, etc.

Figure 2:
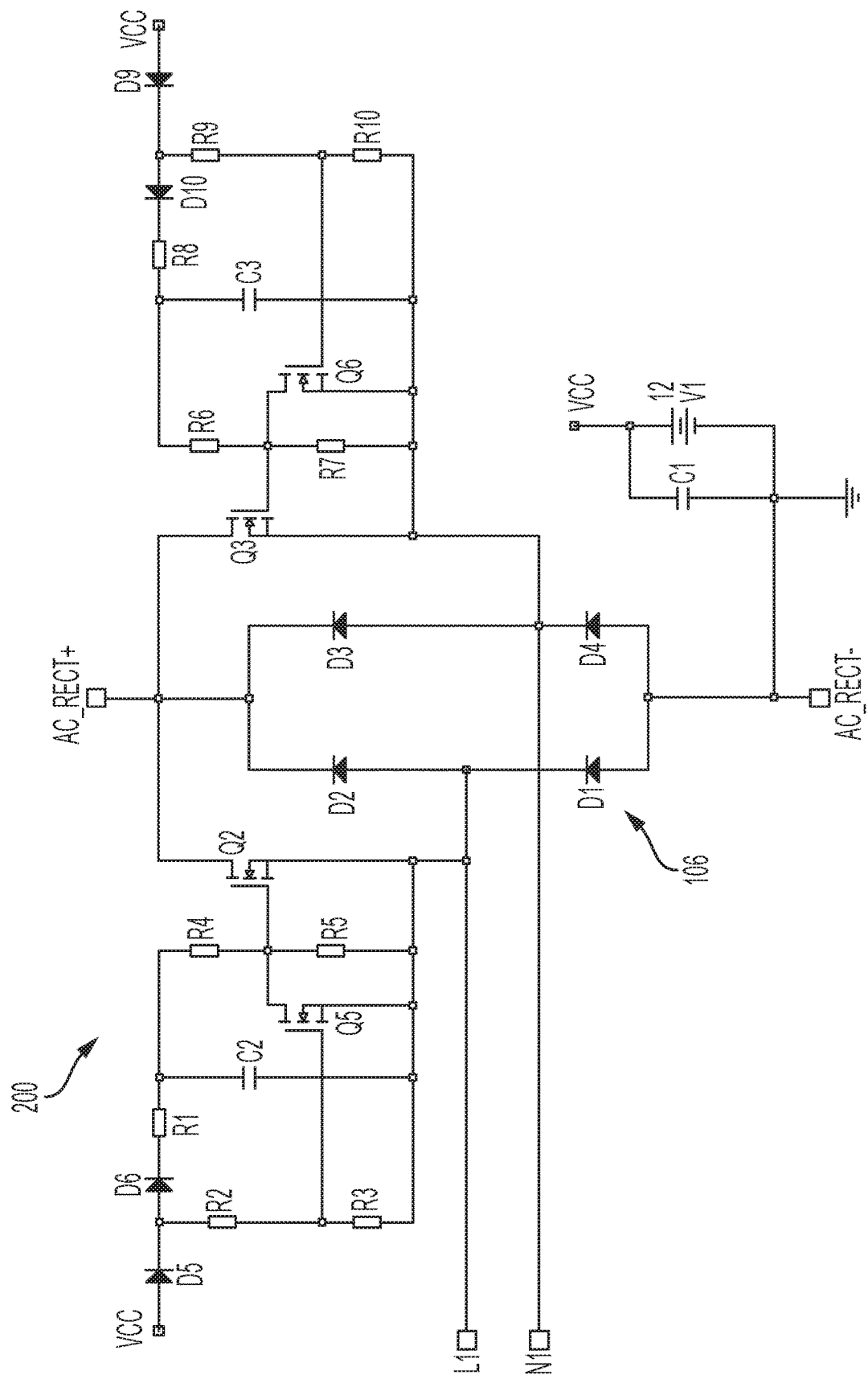
FIG. 2 is a circuit diagram of a rectifier circuit for a power supply, according to one another example embodiment of the present disclosure.

FIG. 2 illustrates a rectifier circuit 200 for a power supply according to one example embodiment of the present disclosure. The rectifier circuit 200 includes a line input L1 and a neutral input N1 for receiving an input voltage from an AC voltage source. The rectifier circuit 200 also includes a diode bridge 106 coupled to the line input L1 and the neutral input N1 to receive the input voltage from the AC voltage source, and output a rectified voltage to voltage outputs AC_RECT+ and AC_RECT−. The diode bridge 106 includes four diodes D1, D2, D3 and D4.

The rectifier circuit 200 also includes two metal-oxide-semiconductor field-effect transistors (MOSFETs) Q2 and Q3, and two transistors Q5 and Q6. The MOSFET Q2 is coupled in parallel with the diode D2, and the MOSFET Q3 is coupled in parallel with the diode D3. Each MOSFET Q2 and Q3, and each transistor Q5 and Q6, may include a gate, a source and a drain.

The transistor Q5 is coupled between the line input L1 and the gate of the MOSFET Q2 to control switching operation of the MOSFET Q2 according to the received input voltage. The transistor Q6 is coupled between the neutral input N1 and the gate of the MOSFET Q3 to control switching operation of the MOSFET Q3 according to the received input voltage.

The rectifier circuit 200 also includes a voltage supply node VCC, and a bootstrap diode D9 coupled between the voltage supply node VCC and the gate of the transistor Q6. The line input L1 and neutral input N1 may receive an AC voltage input. When the neutral input N1 approaches zero with respect to the line input L1, a voltage across bridge diode D4 reduces (e.g., a voltage at the cathode of diode D4 approaches a voltage at the anode of diode D4). The bootstrap diode D9 conducts when its anode voltage is greater than a forward voltage of the diode (e.g., 0.6V). When a voltage at the gate of the transistor Q6 increases above a gate threshold of the transistor Q6, the transistor Q6 turns on to remove gate charge from the MOSFET Q3, thereby turning off the MOSFET Q3.

During an opposite half cycle where the neutral input N1 becomes more positive than the line input L1 (e.g., the line input L1 approaches zero), the transistor Q5 turns on to turn off the MOSFET Q2. Specifically, when a voltage at an anode of the diode D5 is greater than the voltage at a cathode of the diode D5 by at least 0.6V, the diode D5 allows conducts current to turn on the transistor Q5, which then removes gate charge from the MOSFET Q2 to turn off the MOSFET Q2.

Two resistors R9 and R10 are coupled between the neutral input N1 and the voltage supply node VCC to define a voltage divider for controlling turn on of the transistor Q6. A node defined between the resistors R9 and R10 is coupled to the transistor Q6, and a ratio of resistance values of the resistors R9 and R10 may set a turn on and/or turn off voltage threshold for the transistor Q6.

Similarly, two resistors R2 and R3 are coupled between the line input L1 and the voltage supply node VCC to define a voltage divider for controlling turn on of the transistor Q5. A node defined between the resistors R2 and R3 is coupled to the transistor Q5, and a ratio of resistance values of the resistors R2 and R3 may set a turn on and/or turn off voltage threshold for the transistor Q5.

The rectifier circuit 200 also includes a bootstrap bias circuit 228 for providing a high side bias to the MOSFET Q3, and a bootstrap bias circuit 230 for providing a high side bias to the MOSFET Q2. The bootstrap bias circuit 228 includes a diode D10, a resistor R8 and a capacitor C3, and the diode D10 isolates the capacitor C3 from the resistors R9 and R10. The bootstrap bias circuit 230 includes a diode D6, a resistor R1 and a capacitor C2, and the diode D6 isolates the capacitor C2 from the resistors R2 and R3.

The rectifier circuit 200 further includes two resistors R4 and R5 coupled to the gate of the MOSFET Q2, and two resistors R6 and R7 coupled to the gate of the MOSFET Q3. The resistors R4 and R6 may provide voltage biasing for the MOSFETs Q2 and Q3, respectively, and the resistors R5 and R7 may provide gate side impedance control for the MOSFETs Q2 and Q3, respectively.

The diodes D1, D2, D3 and D4 are illustrated in FIG. 2 as a bridge rectifier circuit coupled between the line input L1, the neutral input N1, and the two voltage outputs AC_RECT+ and AC_RECT−. In some embodiments, the diodes D1, D2, D3 and D4 may be part of integrated bridge rectifier (e.g., an integrated circuit chip, etc.). The diodes D1, D2, D3 and D4 may provide a bypass for inrush current and/or surge current during startup of the power supply, during voltage dropouts, voltage transients, etc.

A decoupling capacitor C1 is coupled between the voltage supply node VCC and the voltage output AC_RECT−. The decoupling capacitor C1 is also coupled to an electrical ground, and provides decoupling for the voltage node VCC.

The resistors, R1-R5, the diodes D5 and D6, the capacitor C2 and the transistor Q5 may be considered as a self-driven driver circuit for the MOSFET Q2. Similarly, the resistors, R6-R10, the diodes D9 and D10, the capacitor C3 and the transistor Q6 may be considered as a self-driven driver circuit for the MOSFET Q3.

Figure 3A:
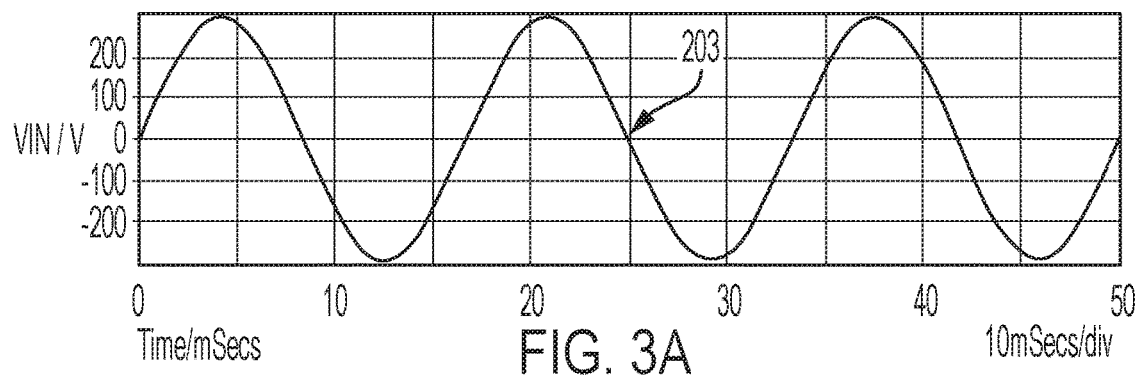
FIGS. 3A-3D are line graphs illustrating example voltage and current waveforms of the rectifier circuit of FIG. 2.

FIGS. 3A-3D illustrates example voltage and current waveforms of the rectifier circuit 200. Specifically, FIG. 3A illustrates the input voltage 203 measured across the line input L1 and the neutral input N1, which has a sinusoidal waveform corresponding to an AC input.

Figure 3B:
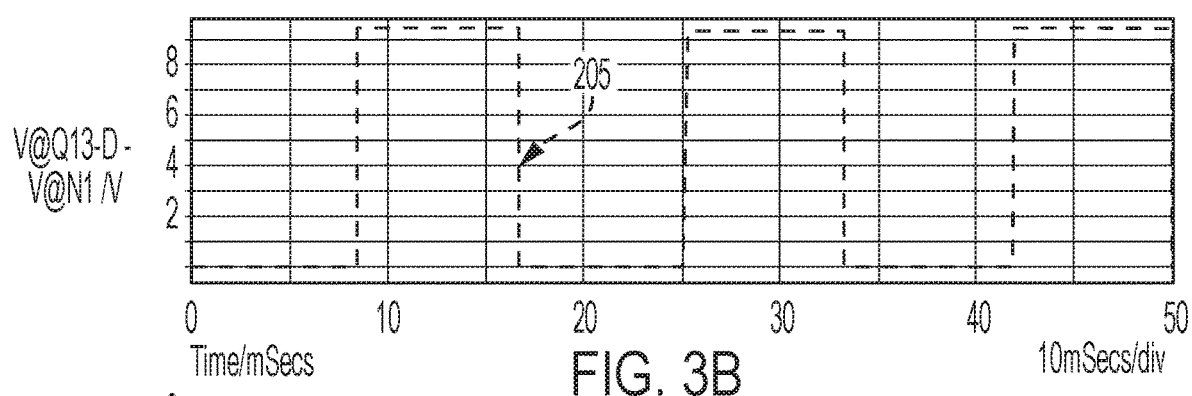
Figure 3C:
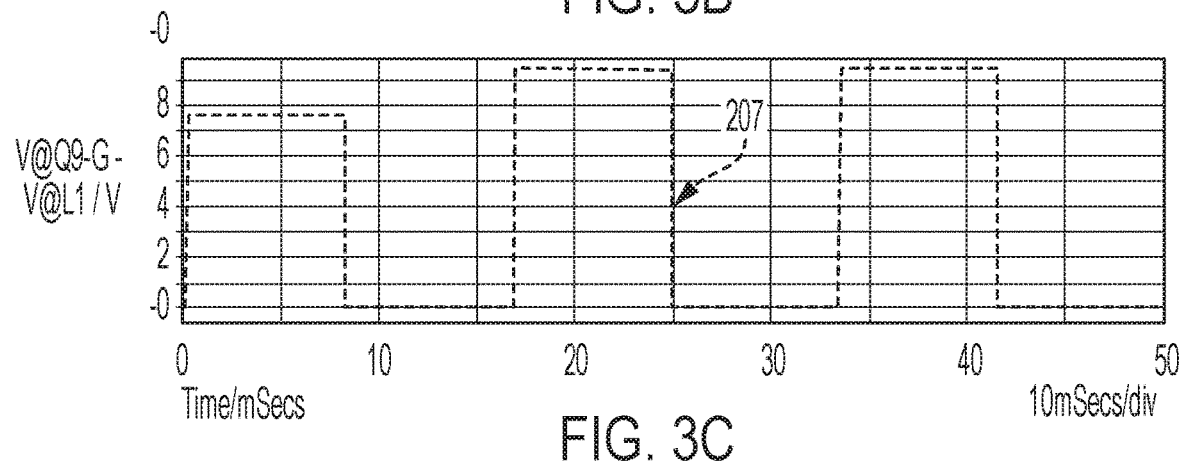

FIG. 3B illustrates a gate-source voltage 205 of the MOSFET Q3, and FIG. 3C illustrates a gate-source voltage 207 of the MOSFET Q2. As shown in FIGS. 3B and 3C, the MOSFET Q2 and the MOSFET Q3 are turned on during opposite half-cycles of the input voltage 203.

Figure 3D:
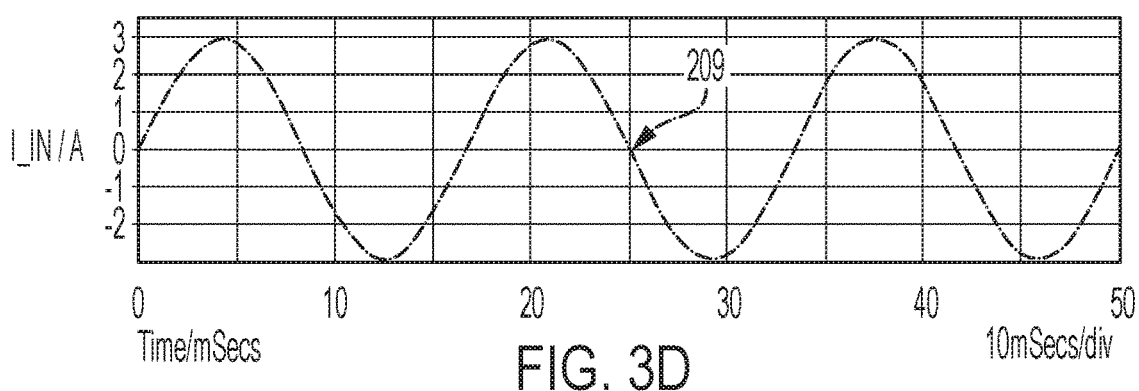

Specifically, the MOSFET Q2 is turned on during positive half-cycles of the input voltage 203, and the MOSFET Q3 is turned on during negative half-cycles of the input voltage 203. FIG. 3D illustrates the input current 209 measured across the line input L1 and the neutral input N1.

Figure 4A:
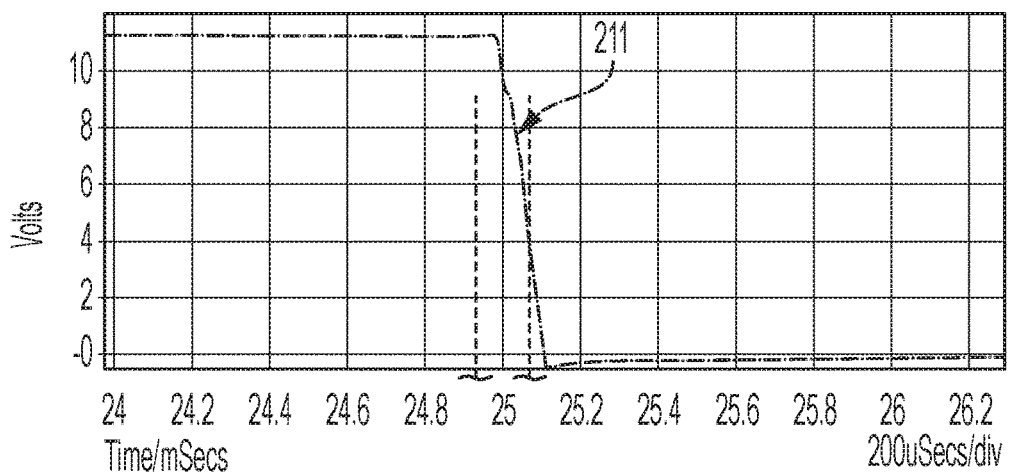
FIGS. 4A-4C are line graphs illustrating example voltage waveforms during a zero-crossing of the input voltage for the rectifier circuit of FIG. 2.
Figure 4B:
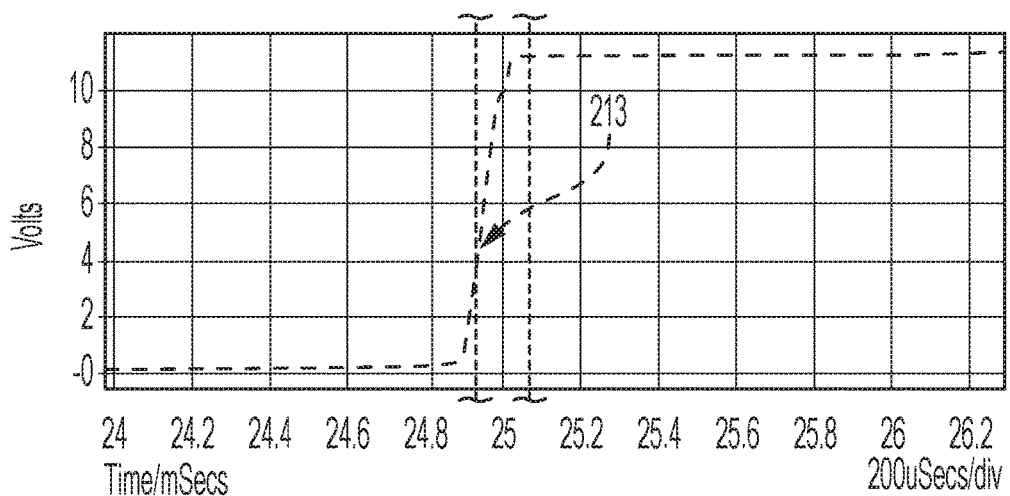
Figure 4C:
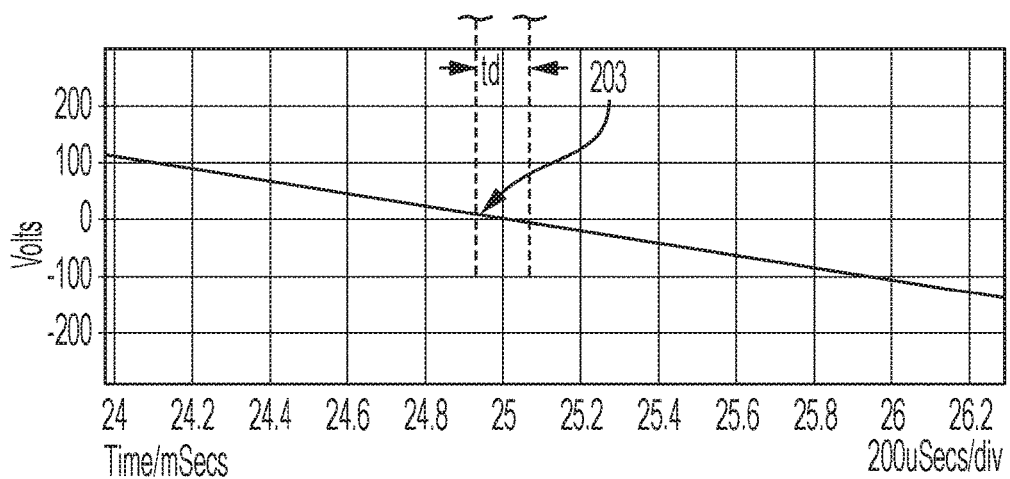

FIGS. 4A-4C illustrate example waveforms showing turn on and turn off of the transistors Q5 and Q6 at the zero-crossing of the input voltage 203. Specifically, FIG. 4A illustrates a gate-source voltage 211 of the transistor Q6, and FIG. 4B illustrates a gate-source voltage 213 of the transistor Q5.

As the input voltage 203 decreases and crosses zero, there is a dead time (td) between turn off of the transistor Q6, and turn on of the transistor Q5. The dead time (td) can inhibit (e.g., prevent) current shoot through (e.g., between the MOSFETs Q2 and Q3, from the line input L1 to the neutral input N1, etc.). The length of the dead time (td) may be adjusted via the resistors R2 and R3 for the transistor Q5, and via the resistors R9 and R10 for the transistor Q6.

Figure 5:
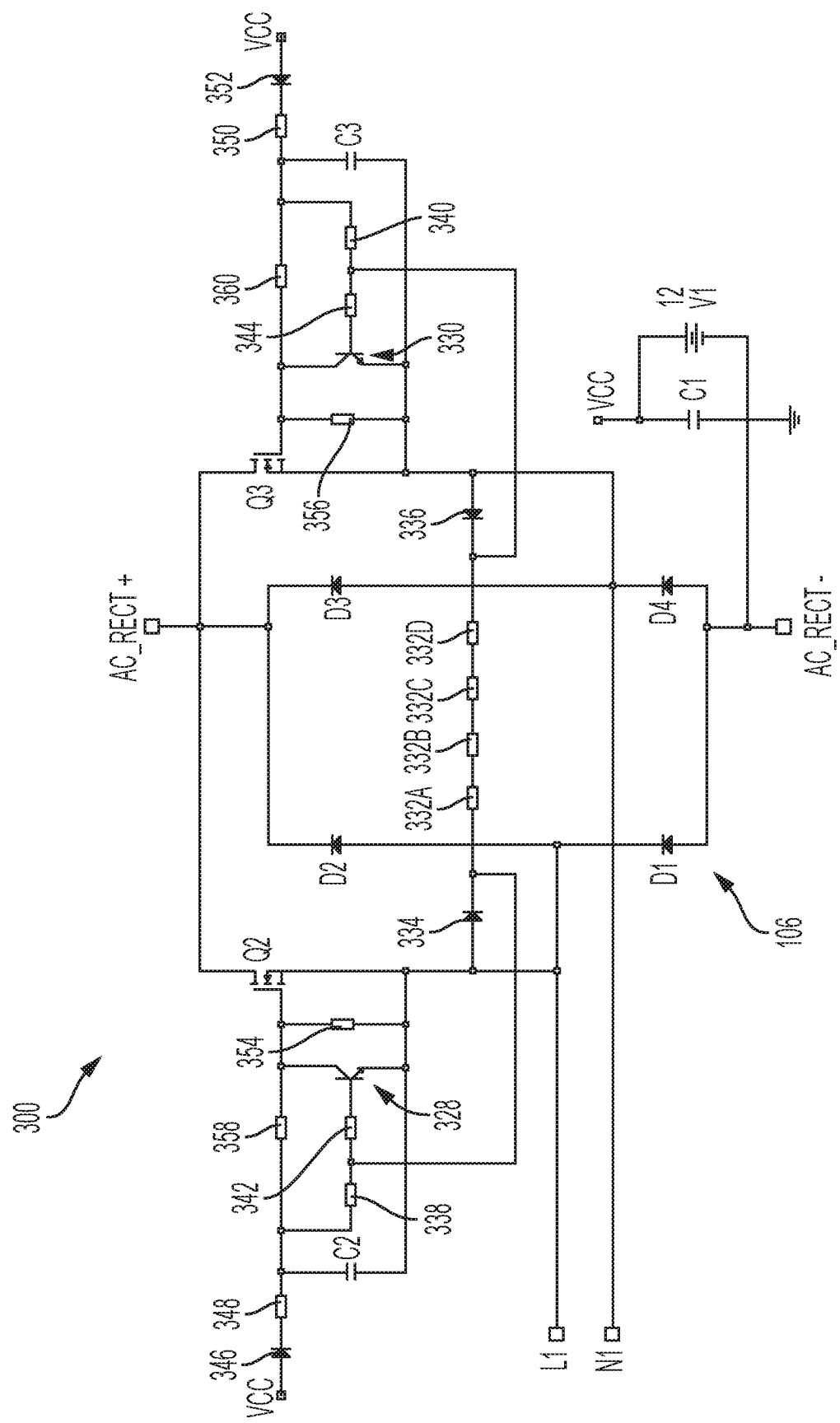
FIG. 5 is a circuit diagram of a rectifier circuit for a power supply, including a resistor chain, according to another example embodiment of the present disclosure.

FIG. 5 illustrates a rectifier circuit 300 for a power supply according to one example embodiment of the present disclosure. The rectifier circuit 300 includes a line input L1 and a neutral input N1 for receiving an input voltage from an AC voltage source. The rectifier circuit 300 also includes a diode bridge 106 coupled to the line input L1 and the neutral input N1 to receive the input voltage from the AC voltage source, and output a rectified voltage to voltage outputs AC_RECT+ and AC_RECT−. The diode bridge 106 includes four diodes D1, D2, D3 and D4.

The rectifier circuit 300 includes two metal-oxide-semiconductor field-effect transistors (MOSFETs) Q2 and Q3, and two transistors 328 and 330. The MOSFET Q2 is coupled in parallel with the diode D2, and the MOSFET Q3 is coupled in parallel with the diode D3. Each MOSFET Q2 and Q3 may include a gate, a source and a drain, and each transistor 328 and 330 may include a base, a collector and an emitter. Although FIG. 5 illustrates the transistors 328 and 330 as bipolar-junction transistors (BJTs), other embodiments may use other transistors such as MOSFETs, etc.

The transistor 328 is coupled between the line input L1 and the gate of the MOSFET Q2 to control switching operation of the MOSFET Q2 according to the received input voltage. The transistor 330 is coupled between the neutral input N1 and the gate of the MOSFET Q3 to control switching operation of the MOSFET Q3 according to the received input voltage.

For example, when a voltage at the line input L1 becomes positive with respect to the neutral input N1, the transistor 330 may receive a forward bias current to turn on the transistor 330. The transistor 330 may then turn off the MOSFET Q3 by removing a gate charge of the MOSFET Q3. Similarly, when a voltage at the neutral input N1 becomes positive with respect to the line input L1, the transistor 328 may receive a forward bias current to turn on the transistor 328. The transistor 328 may then turn off the MOSFET Q2 by removing a gate charge of the MOSFET Q2.

The rectifier circuit 300 also includes a resistor biasing network including four resistors 332A, 332B, 332C and 332D. The resistor 332A is coupled to the line input L1 via a reverse voltage clamp diode 334, and the resistor 332D is coupled to the neutral input N1 via a reverse voltage clamp diode 336.

Although FIG. 5 illustrates a chain of four discrete resistors 332A, 332B, 332C and 332D coupled between the line input L1 and the neutral input N1, other embodiments may include more or less resistors, an integrated high voltage array, etc. Similarly, the reverse voltage clamp diodes 334 and 336 are optional, and can be eliminated (or replaced with resistor(s), etc.) in cases where bias voltages on the transistors 328 and 330 do not exceed reverse breakdown voltage ratings for those devices, etc. One potential advantage of the circuit 200 of FIG. 2 compared to the circuit 300 of FIG. 3 is that the circuit 200 may not require a high-voltage resistor chain, etc. to sense a voltage.

The resistor 338 is coupled with the resistors 332A, 332B, 332C and 332D to form a biasing network for the transistor 328. The values of resistors 332A, 332B, 332C, 332D and 338 can set a threshold value for turn on of the transistor 328, according to the input voltage. Similarly, the resistor 340 is coupled with the resistors 332A, 332B, 332C and 332D to form a biasing network for the transistor 330. The values of resistors 332A, 332B, 332C, 332D and 340 can set a threshold value for turn on of the transistor 330, according to the input voltage.

The rectifier circuit 300 includes optional impedance control resistors 342 and 344. The impedance control resistor 342 is coupled between the line input L1 and the base of the transistor 328, and the impedance control resistor 344 is coupled between the neutral input N1 and the base of the transistor 330. The impedance control resistors 342 and 344 may be eliminated based on a speed of switching operation of the transistors 328 and 330, a layout of the circuit arrangements of the rectifier circuit 300, etc.

A bootstrap bias circuit for the MOSFET Q2 includes a diode 346, a resistor 348 and a capacitor C2, and a bootstrap bias circuit for the MOSFET Q3 includes a diode 350, a resistor 352 and a capacitor C3. The rectifier circuit 300 also includes a gate side impedance control resistor 354 coupled between the line input L1 and the gate of the MOSFET Q2, a gate side impedance control resistor 356 coupled between the neutral input N1 and the gate of the MOSFET Q3, a voltage biasing resistor 358 coupled between the voltage supply node VCC and the gate of the MOSFET Q2, and a voltage biasing resistor 360 coupled between the voltage supply node VCC and the gate of the MOSFET Q3.

Figure 6C:
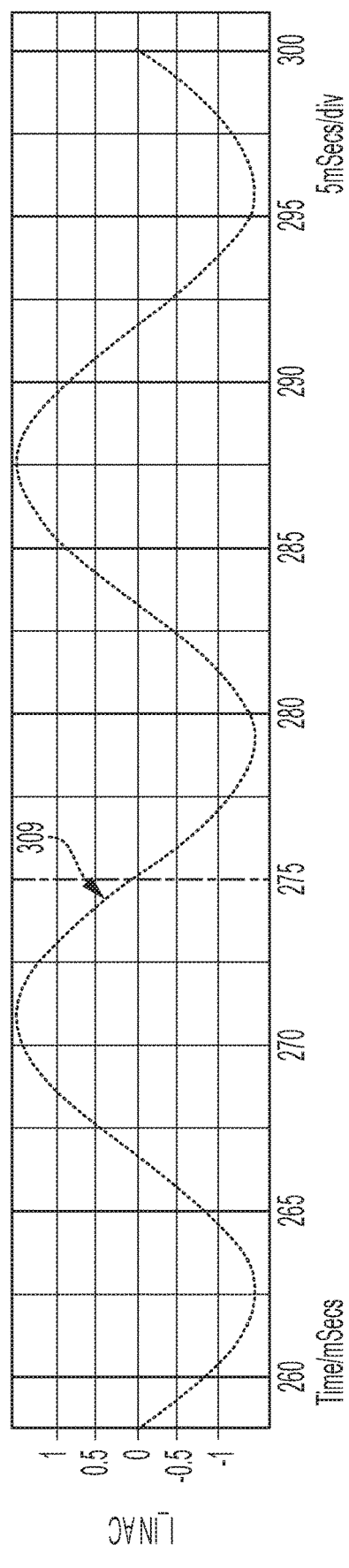
Figure 6D:
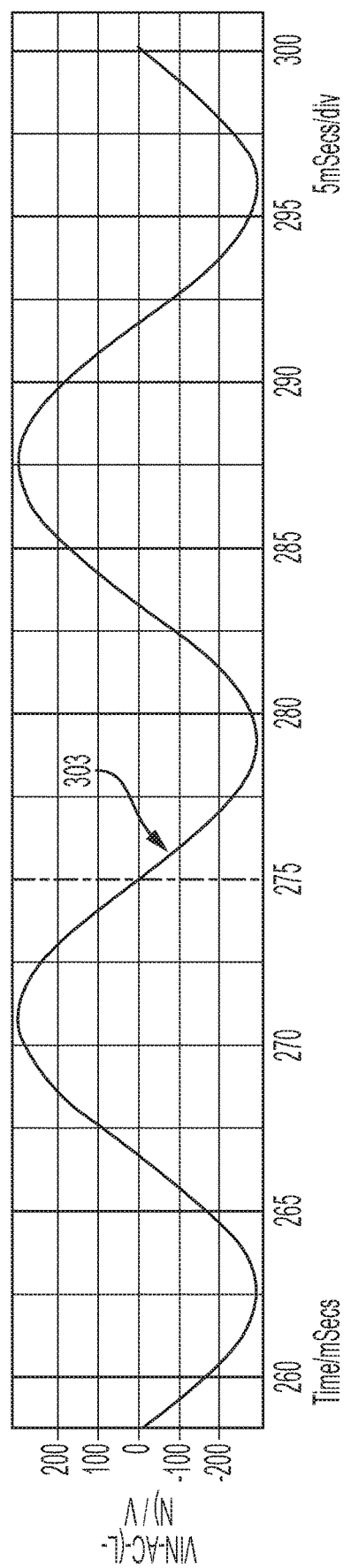

FIGS. 6A-6D illustrate example voltage and current waveforms of the rectifier circuit 300. Specifically, FIG. 6C illustrates the input voltage 303 measured across the line input L1 and the neutral input N1, which has a sinusoidal waveform corresponding to an AC input. FIG. 6C illustrates the input current 309 measured across the line input L1 and the neutral input N1.

FIG. 6A illustrates a gate-source voltage 307 of the MOSFET Q2, and FIG. 6B illustrates a gate-source voltage 305 of the MOSFET Q2. As shown in FIGS. 6A and 6B, the MOSFET Q2 and the MOSFET Q3 are turned on during opposite half-cycles of the input voltage 303. Specifically, the MOSFET Q2 is turned on during positive half-cycles of the input voltage 303, and the MOSFET Q3 is turned on during negative half-cycles of the input voltage 303.

As the input voltage 303 decreases and crosses zero, there is a dead time (td) between turn off of the MOSFET Q2, and turn on of the MOSFET Q3. The dead time (td) can inhibit (e.g., prevent) current shoot through (e.g., between the MOSFETs Q2 and Q3, from the line input L1 to the neutral input N1, etc.). The length of the dead time (td) may be adjusted via values of the resistors 338 and 358 for the transistor Q5, and via values of the resistors 340 and 360 for the transistor Q6.

Figure 7A:
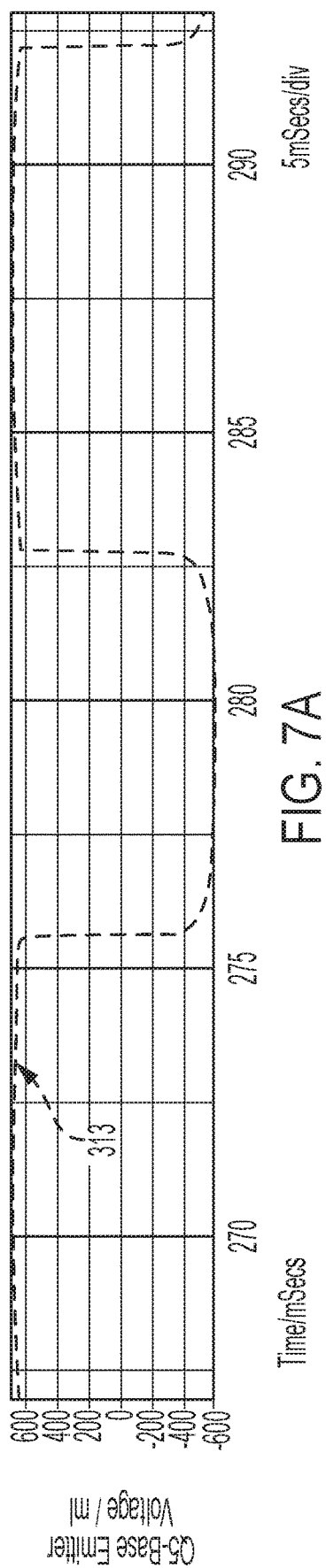
FIGS. 7A-7E are line graphs illustrating example voltage waveforms of four transistors of the rectifier circuit of FIG. 5.
Figure 7B:
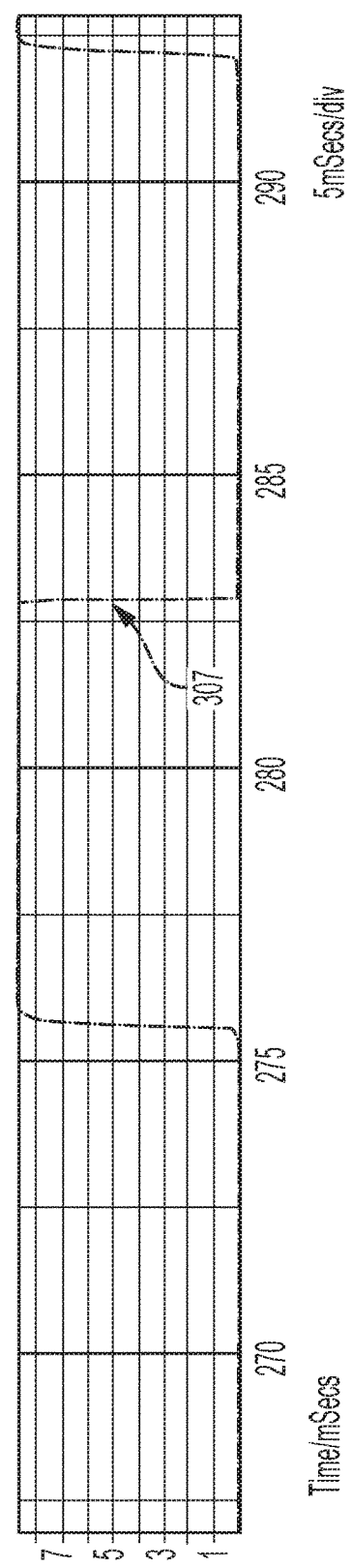
Figure 7C:
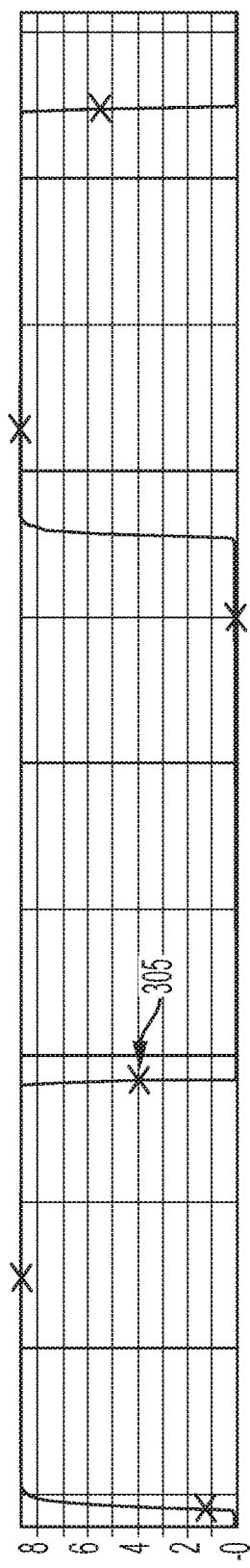
Figure 7D:
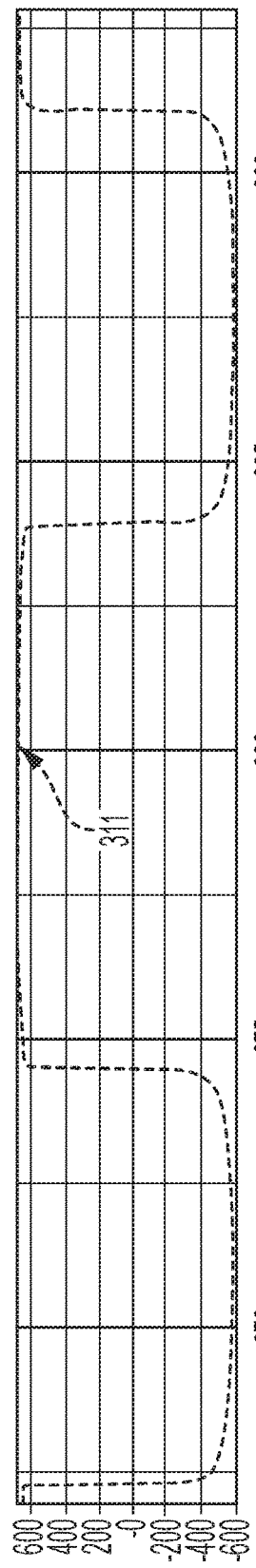
Figure 7E:
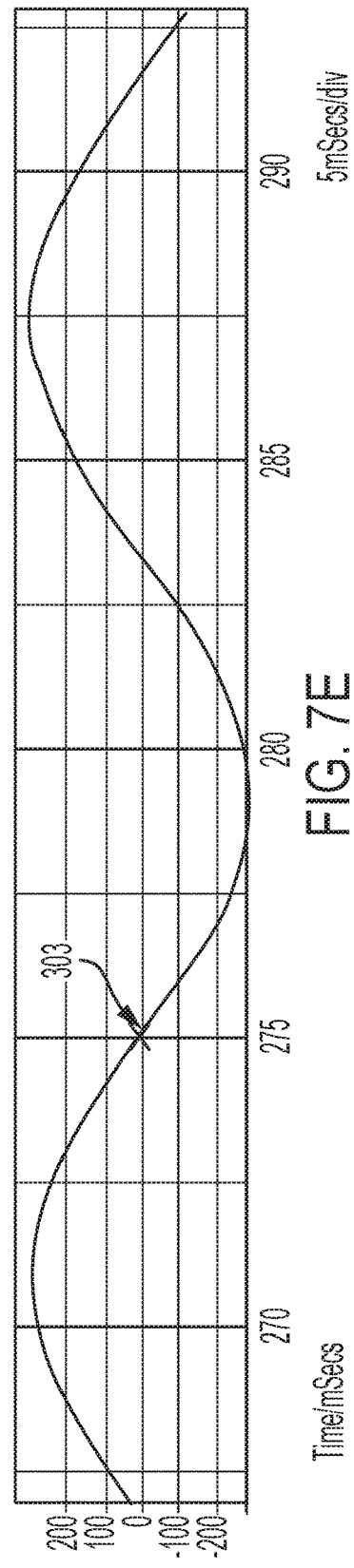

FIGS. 7A-7E illustrate example waveforms showing turn on and turn off of the transistors 328 and 330, compared to turn on and turn off of the MOSFETs Q2 and Q3. Specifically, FIG. 7A illustrates a base-emitter voltage 313 of the transistor 330, FIG. 7B illustrates a gate-source voltage 307 of the MOSFET Q3, FIG. 7C illustrates a gate-source voltage 305 of the MOSFET Q2, FIG. 7D illustrates a base-emitter voltage 311 of the transistor 330, and FIG. 7E illustrates the input voltage 303 measured across the line input L1 and the neutral input N1.

As shown in FIGS. 7A-7E, during positive half-cycles of the input voltage 303, the transistor 330 is turned on to turn off the MOSFET Q3. During negative half-cycles of the input voltage 303, the transistor 328 is turned on to turn off the MOSFET Q2.

Figure 8:
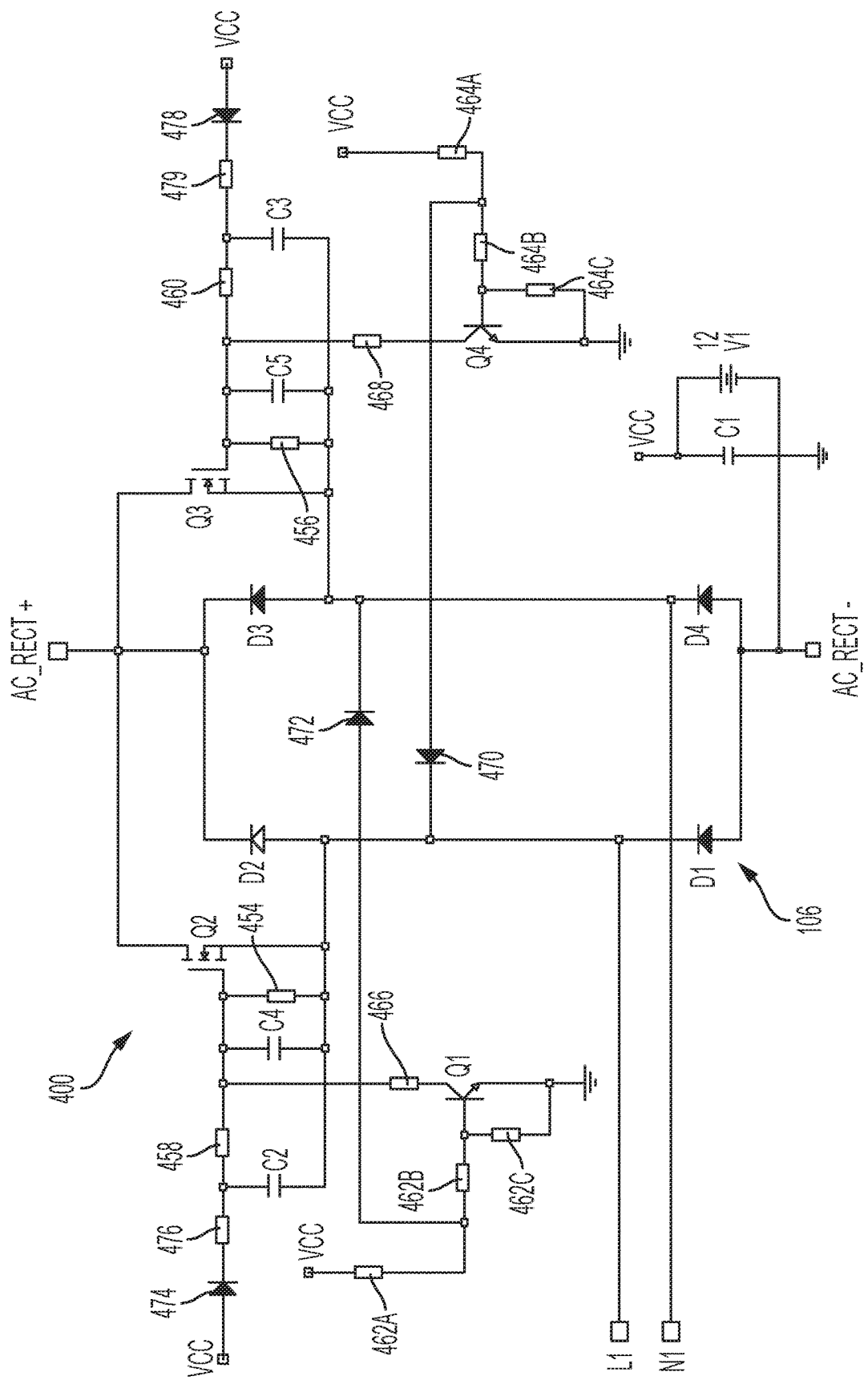
FIG. 8 is a circuit diagram of a rectifier circuit for a power supply, including two bias removal diodes, according to another example embodiment of the present disclosure.

FIG. 8 illustrates a rectifier circuit 400 for a power supply according to another example embodiment of the present disclosure. The rectifier circuit 400 includes a line input L1 and a neutral input N1 for receiving an input voltage from an AC voltage source. The rectifier circuit 400 also includes a diode bridge 106 coupled to the line input L1 and the neutral input N1 to receive the input voltage from the AC voltage source, and output a rectified voltage to voltage outputs AC_RECT+ and AC_RECT−. The diode bridge 106 includes four diodes D1, D2, D3 and D4.

The rectifier circuit 400 also includes two metal-oxide-semiconductor field-effect transistors (MOSFETs) Q2 and Q3, and two transistors Q1 and Q4. The MOSFET Q2 is coupled in parallel with the diode D2, and the MOSFET Q3 is coupled in parallel with the diode D3. Each MOSFET Q2 and Q3 may include a gate, a source and a drain, and each transistor Q1 and Q4 may include a base, a collector and an emitter.

Although FIG. 8 illustrates the transistors Q1 and Q4 as bipolar-junction transistors (BJTs), other embodiments may use other transistors such as MOSFETs, etc. In some embodiments, the transistors Q1 and Q4 may include high voltage NPN transistors (e.g., having a high VCE breakdown voltage), and may be selected based on a max line voltage and derating.

The transistor Q1 is coupled between the neutral input N1 and the gate of the MOSFET Q2 to control switching operation of the MOSFET Q2 according to the received input voltage. The transistor Q4 is coupled between the line input L1 and the gate of the MOSFET Q3 to control switching operation of the MOSFET Q3 according to the received input voltage.

For example, when a voltage at the line input L1 starts decreasing towards zero with respect to the neutral input N1, a base bias current of the transistor Q4 is removed via a high voltage line synchronous base bias removal diode 470, which causes the transistor Q4 to turn off. Turn off of the transistor Q4 turns on the MOSFET Q3, by allowing current through the voltage biasing resistor 460 to charge the gate of the MOSFET Q3. Parameters of the bias removal diode 470 may be selected based on a required blocking voltage for the transistor Q1.

During the next half-cycle of the input voltage when the neutral input N1 is decreasing towards zero with respect to the line input L1, a base bias current of the transistor Q1 is removed via a high voltage line synchronous base bias removal diode 472, which causes the transistor Q1 to turn off. Turn off of the transistor Q1 turns on the MOSFET Q2, by allowing current through the voltage biasing resistor 458 to charge the gate of the MOSFET Q2. Parameters of the bias removal diode 472 may be selected based on a required blocking voltage for the transistor Q1.

The rectifier circuit 400 includes three resistors 462A, 462B and 462C that form a biasing network for the transistor Q1, and three resistors 464A, 464B and 464C that form a biasing network for the transistor Q4. The values of resistors 462A, 462B and 462C may set a threshold value for turn on of the transistor Q1, according to the input voltage. Similarly, the values of resistors 464A, 464B and 464C may set a threshold value for turn on of the transistor Q4, according to the input voltage.

The rectifier circuit 400 includes two optional current limiting resistors 466 and 466. The current limiting resistor 466 is coupled between the transistor Q1 and the gate of the MOSFET Q2, and the current limiting resistor 468 is coupled between the transistor Q4 and the gate of the MOSFET Q3. In some embodiments, the optional current limiting resistors 462 and 464 may be eliminated (e.g., by designing proper timing through biasing resistors 462A, 462B, 462C, 464A, 464B and 464C, etc.).

A bootstrap bias circuit for the MOSFET Q2 includes a diode 474, a resistor 476 and a capacitor C2, and a bootstrap bias circuit for the MOSFET Q3 includes a diode 478, a resistor 479 and a capacitor C3. The rectifier circuit 400 also includes a gate side impedance control resistor 454 and a turn on timing control capacitor C4 coupled between the line input L1 and the gate of the MOSFET Q2, and a gate side impedance control resistor 456 and a turn on timing control capacitor C5 coupled between the neutral input N1 and the gate of the MOSFET Q3.

Figure 9A:
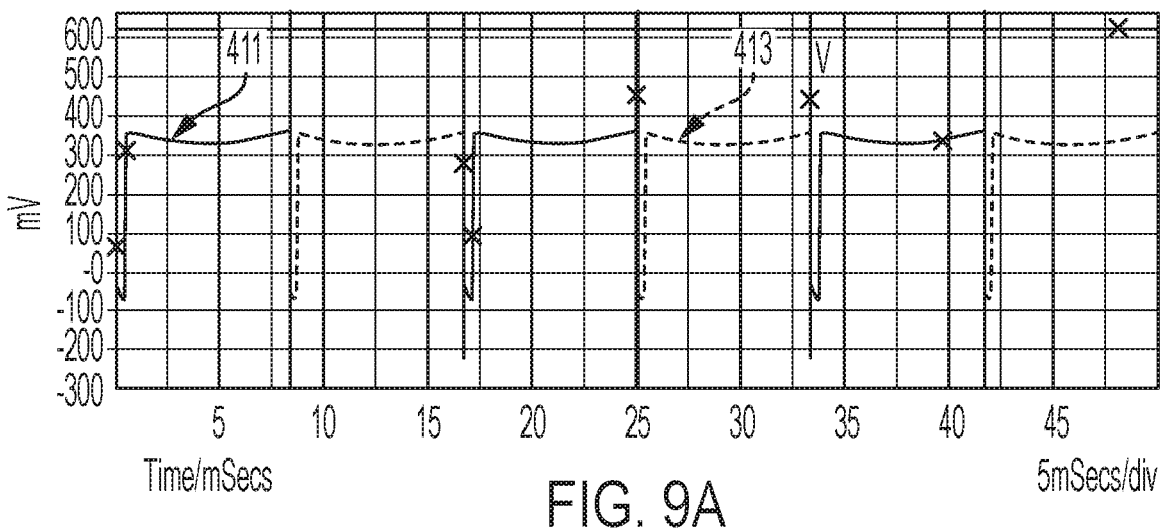
FIGS. 9A-9C are line graphs illustrating example voltage waveforms of the rectifier circuit of FIG. 8.
Figure 9B:
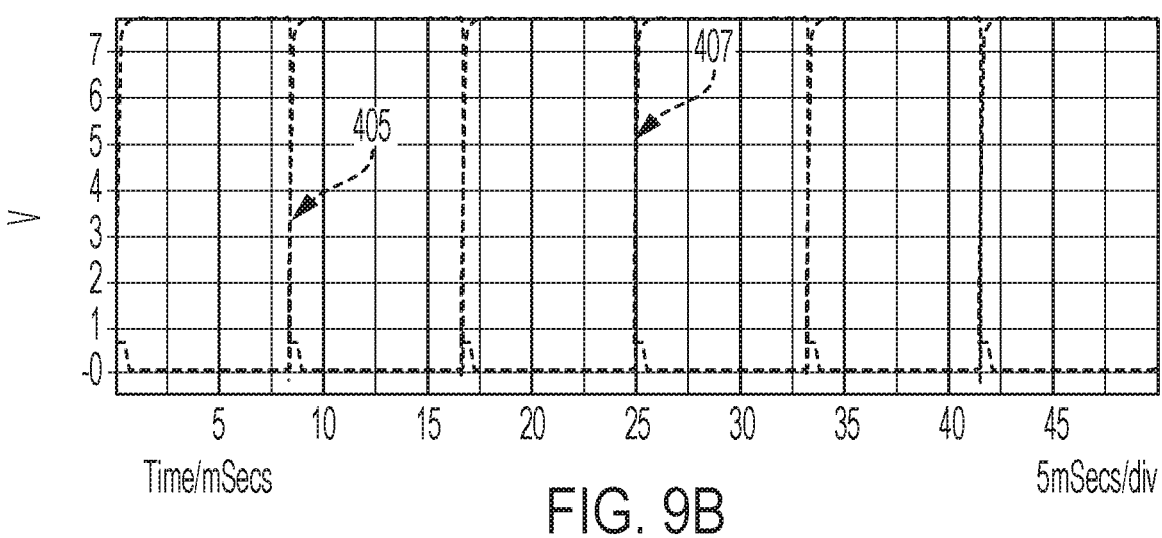
Figure 9C:
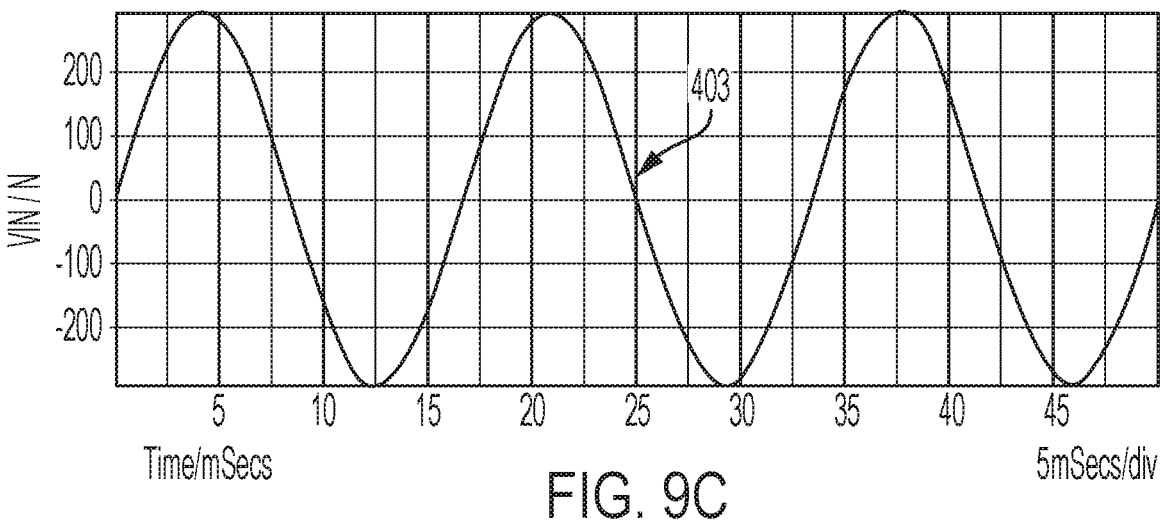

FIGS. 9A-9C illustrates example voltage and current waveforms of the rectifier circuit 400. Specifically, FIG. 9C illustrates the input voltage 403 measured across the line input L1 and the neutral input N1, which has a sinusoidal waveform corresponding to an AC input.

FIG. 9A illustrates a base-emitter voltage 411 of the transistor Q1, and a base-emitter voltage 413 of the transistor Q4. FIG. 9B illustrates a gate-source voltage 405 of the MOSFET Q2, and a gate-source voltage 407 of the MOSFET Q3. As shown in FIGS. 9A-9C, the MOSFET Q2 and the MOSFET Q3 are turned on during opposite half-cycles of the input voltage 403. Specifically, the MOSFET Q2 is turned on during positive half-cycles of the input voltage 403 while the transistor Q1 is turned off, and the MOSFET Q3 is turned on during negative half-cycles of the input voltage 403 while the transistor Q4 is turned off.

Figure 10A:
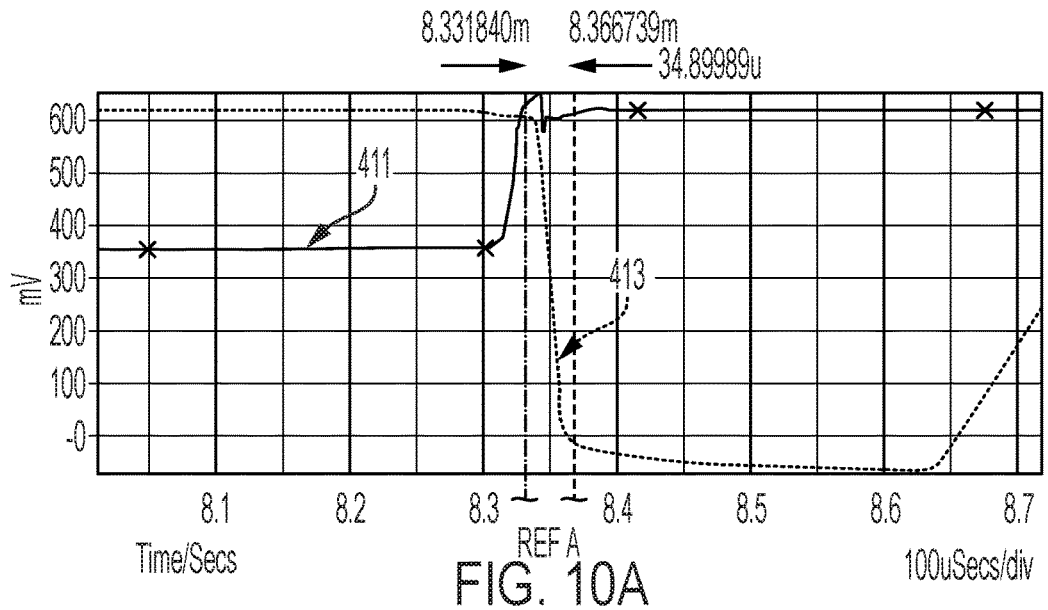
FIGS. 10A-10C are line graphs illustrating example voltage waveforms during a zero-crossing of the input voltage in a negative direction for the rectifier circuit of FIG. 8.
Figure 10B:
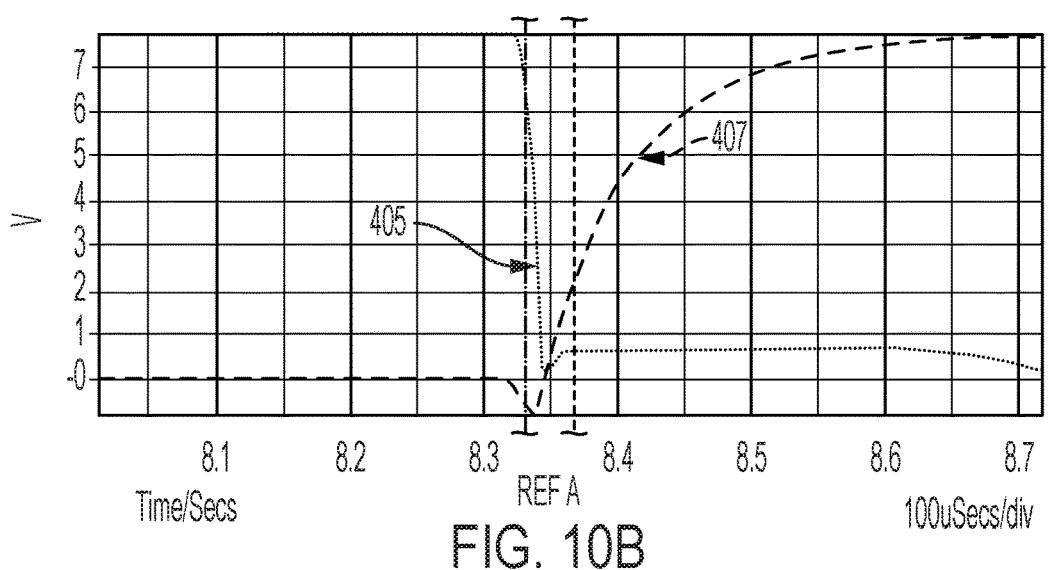
Figure 10C:
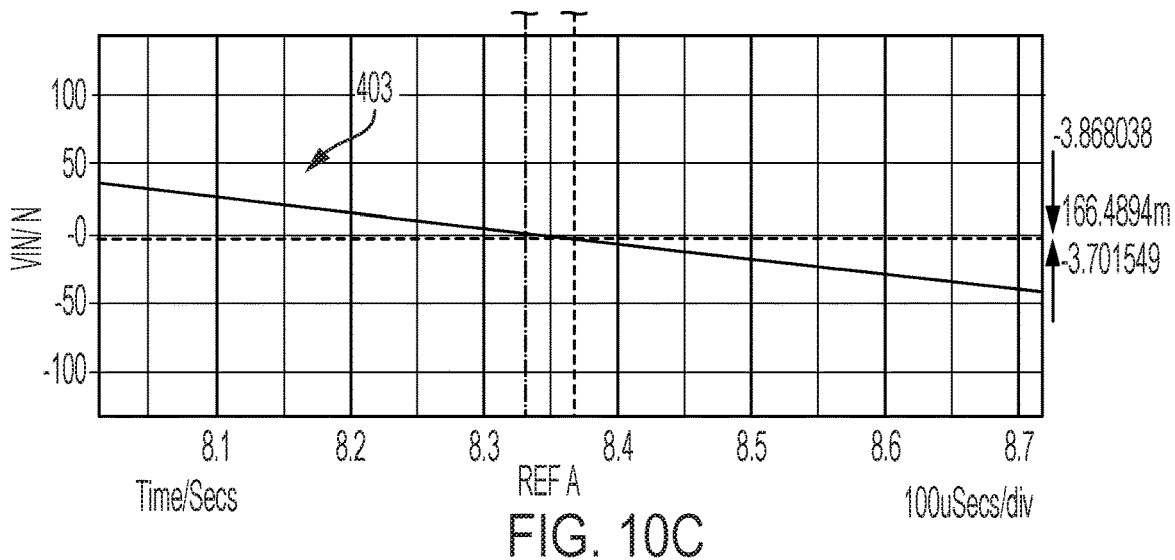

FIGS. 10A-10C illustrate example waveforms showing turn on and turn off of the transistors Q1 and Q4, and the MOSFETs Q2 and Q3, at the zero-crossing of the input voltage 403. Specifically, FIG. 10C illustrates a zero-crossing of the input voltage 403 as the input voltage is decreasing.

FIG. 10A illustrates a base-emitter voltage 411 of the transistor Q1, and a base-emitter voltage 413 of the transistor Q4, with a dead time between turn on of the transistor Q1 and turn off of the transistor Q4. Similarly, FIG. 10B illustrates a gate-source voltage 405 of the MOSFET Q2, and a gate-source voltage 407 of the MOSFET Q3, with a dead time between turn on of the MOSFET Q3 and turn off of the MOSFET Q2.

Figure 11A:
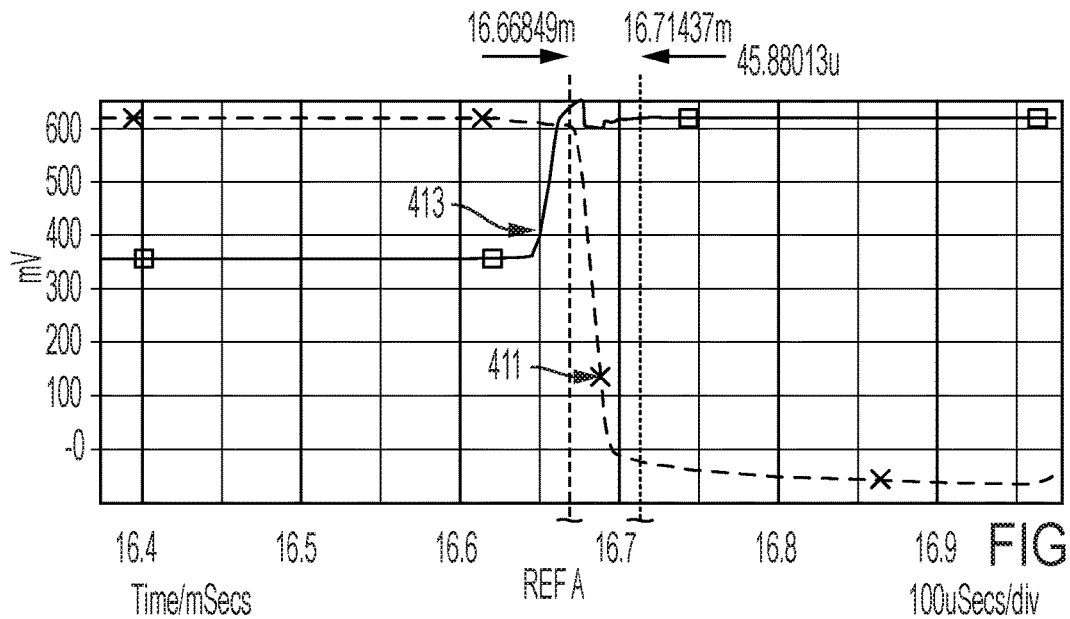
FIGS. 11A-11C are line graphs illustrating example voltage waveforms during a zero-crossing of the input voltage in the positive direction for the rectifier circuit of FIG. 8.
Figure 11B:
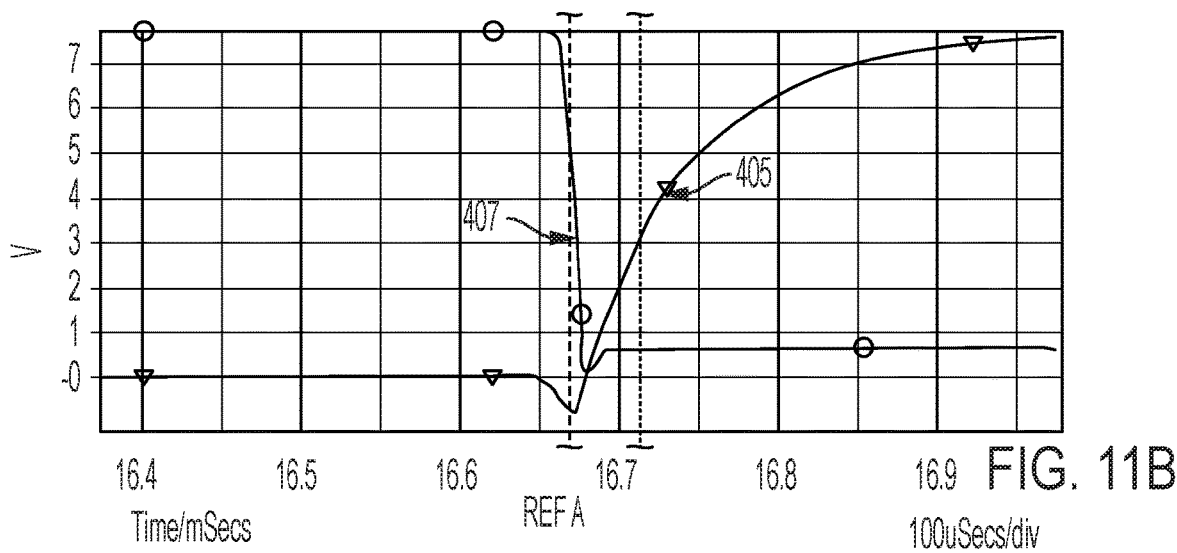
Figure 11C:
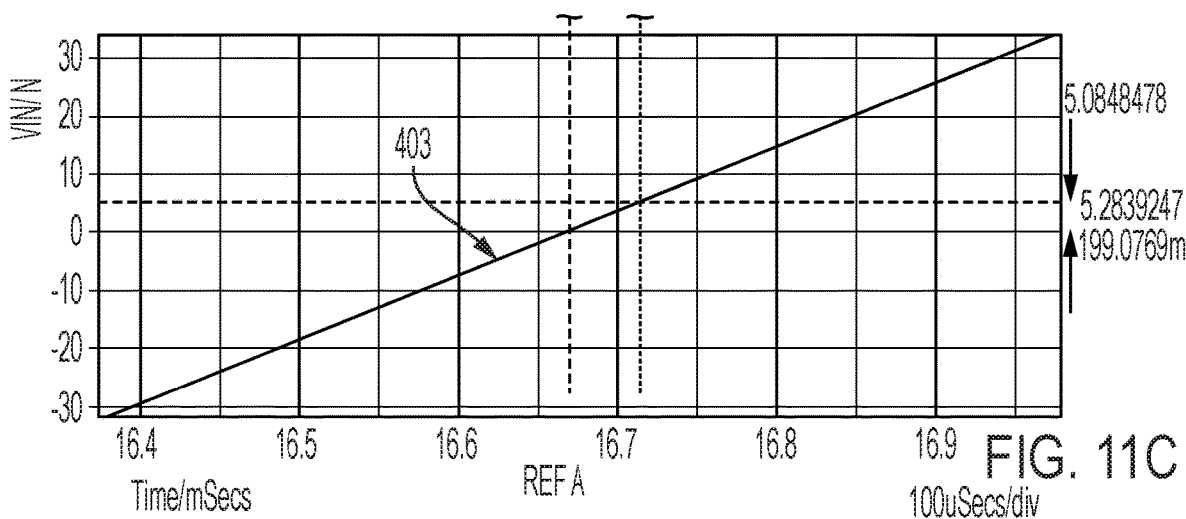

FIGS. 11A-11C illustrate example waveforms showing turn on and turn off of the transistors Q1 and Q4, and the MOSFETs Q2 and Q3, at the zero-crossing of the input voltage 403 as the input voltage 403 is increasing.

FIG. 11A illustrates a base-emitter voltage 411 of the transistor Q1, and a base-emitter voltage 413 of the transistor Q4, with a dead time between turn on of the transistor Q4 and turn off of the transistor Q1. Similarly, FIG. 11B illustrates a gate-source voltage 405 of the MOSFET Q2, and a gate-source voltage 407 of the MOSFET Q3, with a dead time between turn on of the MOSFET Q2 and turn off of the MOSFET Q3.

Figure 12:
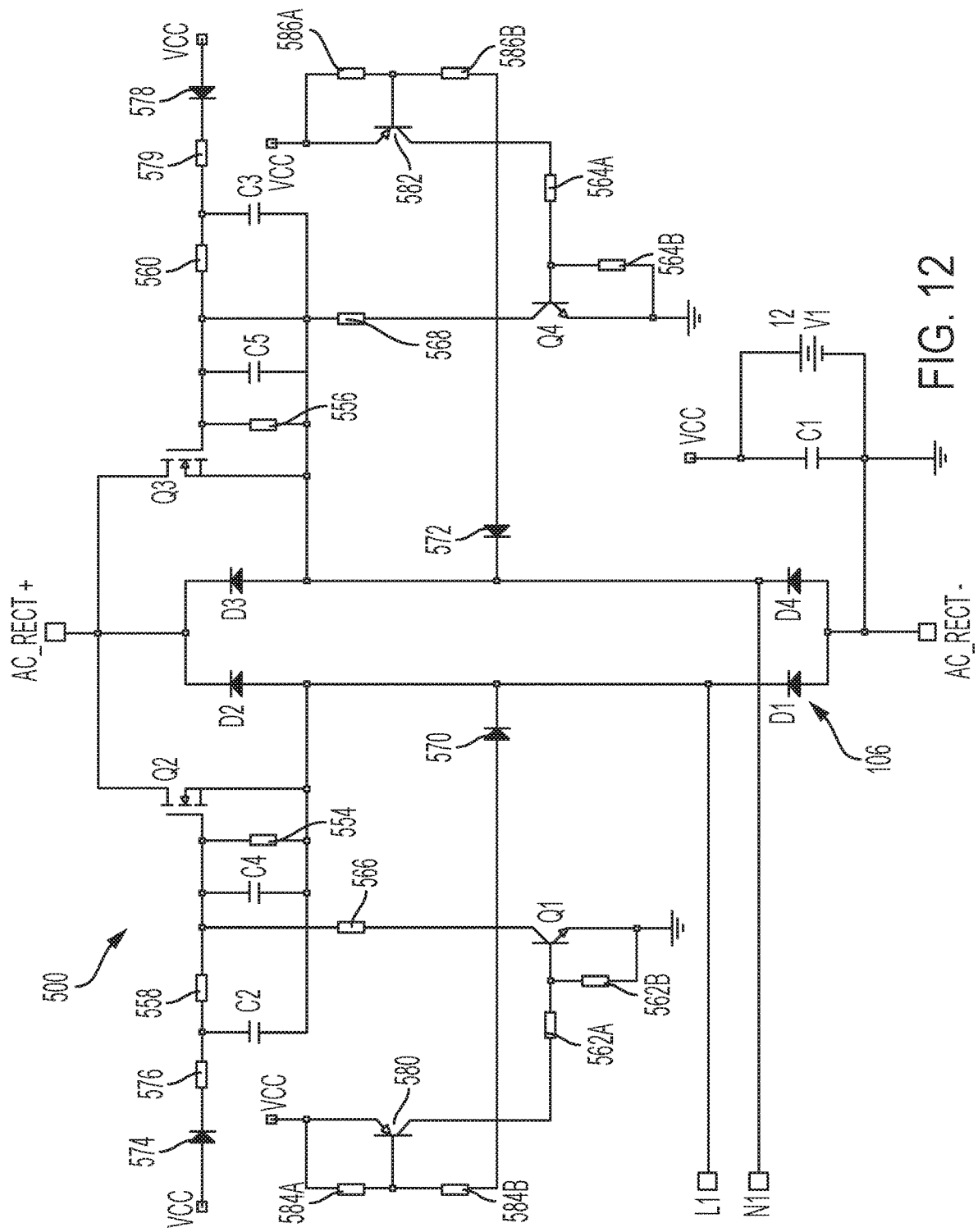
FIG. 12 is a circuit diagram of a rectifier circuit for a power supply, including six transistors, according to another example embodiment of the present disclosure.

FIG. 12 illustrates a rectifier circuit 500 for a power supply according to another example embodiment of the present disclosure. The rectifier circuit 500 includes a line input L1 and a neutral input N1 for receiving an input voltage from an AC voltage source. The rectifier circuit 500 also includes a diode bridge 106 coupled to the line input L1 and the neutral input N1 to receive the input voltage from the AC voltage source, and output a rectified voltage to voltage outputs AC_RECT+ and AC_RECT−. The diode bridge 106 includes four diodes D1, D2, D3 and D4.

The rectifier circuit 500 further includes two metal-oxide-semiconductor field-effect transistors (MOSFETs) Q2 and Q3, and four transistors Q1, Q4, 580 and 582. The MOSFET Q2 is coupled in parallel with the diode D2, and the MOSFET Q3 is coupled in parallel with the diode D3. Each MOSFET Q2 and Q3 may include a gate, a source and a drain, and each transistor Q1, Q4, 580 and 582 may include a base, a collector and an emitter.

Although FIG. 12 illustrates the transistors Q1, Q4, 580 and 582 as bipolar-junction transistors (BJTs), other embodiments may use other transistors such as MOSFETs, etc. In some embodiments, the transistors Q1, Q4, 580 and/or 582 may include high voltage NPN transistors (e.g., having a high VCE breakdown voltage), and may be selected based on a max line voltage and derating.

The transistors Q1 and 580 are coupled between the line input N1 and the gate of the MOSFET Q2 to control switching operation of the MOSFET Q2 according to the received input voltage. The transistors Q4 and 582 are coupled between the neutral input L1 and the gate of the MOSFET Q3 to control switching operation of the MOSFET Q3 according to the received input voltage.

For example, when a voltage at the line input L1 starts increasing above zero with respect to the neutral input N1, a base bias current of the transistor 580 is removed as a high voltage line synchronous base bias removal diode 570 becomes reversed biased. This causes the transistor 580 to turn on, thereby turning off the transistor Q1. Turning off the transistor Q1 allows current through the voltage biasing resistor 558 to charge the gate of the MOSFET Q2, thereby turning on the MOSFET Q2. Parameters of the bias removal diode 570 may be selected based on a required blocking voltage for the transistor 580.

During the next half-cycle of the input voltage when the neutral input N1 is increasing above zero with respect to the line input L1, a base bias current of the transistor 582 is removed as a high voltage line synchronous base bias removal diode 572 becomes reversed biased, which causes the transistor 582 to turn on. Turn on of the transistor 582 turns off the transistor Q4, which turns on the MOSFET Q3 by allowing current through the voltage biasing resistor 560 to charge the gate of the MOSFET Q3. Parameters of the bias removal diode 572 may be selected based on a required blocking voltage for the transistor 582.

The rectifier circuit 500 includes two resistors 584A and 584B that form a biasing network for the transistor 580, two resistors 586A and 586B that form a biasing network for the transistor 582, two resistors 562A and 562B that form a biasing network for the transistor Q1, and two resistors 564A and 564B that form a biasing network for the transistor Q4.

The values of the resistors 584A and 584B may set a threshold value for turn on of the transistor 580, while the values of the resistors 562A and 562B set a threshold value for turn on of the transistor Q1, according to the input voltage. Similarly, the values of the resistors 586A and 586B may set a threshold value for turn on of the transistor 582, while the values of the resistors 564A and 564B set a threshold value for turn on of the transistor Q4, according to the input voltage.

The rectifier circuit 500 includes two optional current limiting resistors 566 and 568. The current limiting resistor 566 is coupled between the transistor Q1 and the gate of the MOSFET Q2, and the current limiting resistor 568 is coupled between the transistor Q4 and the gate of the MOSFET Q3. In some embodiments, the optional current limiting resistors 566 and 568 may be eliminated (e.g., by designing proper timing through biasing resistors 562A, 562B, 564A, 564B, 584A, 584B, 586A and 586B, etc.).

A bootstrap bias circuit for the MOSFET Q2 includes a diode 574, a resistor 576 and a capacitor C2, and a bootstrap bias circuit for the MOSFET Q3 includes a diode 578, a resistor 579 and a capacitor C3. The rectifier circuit 400 also includes a gate side impedance control resistor 554 and a turn on timing control capacitor C4 coupled between the line input L1 and the gate of the MOSFET Q2, and a gate side impedance control resistor 556 and a turn on timing control capacitor C5 coupled between the neutral input N1 and the gate of the MOSFET Q3.

Figure 13A:
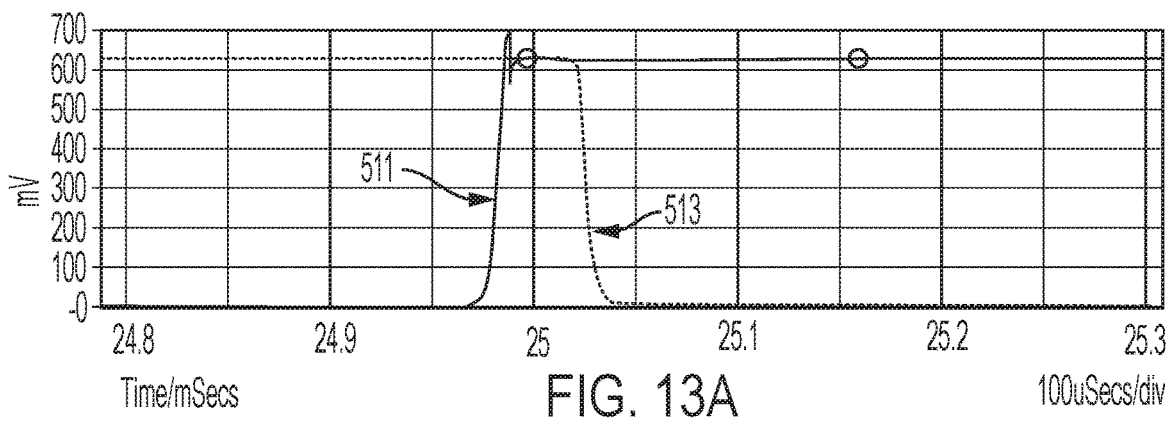
FIGS. 13A-13D are line graphs illustrating example voltage waveforms during a zero-crossing of the input voltage in a negative direction for the rectifier circuit of FIG. 12.
Figure 13B:
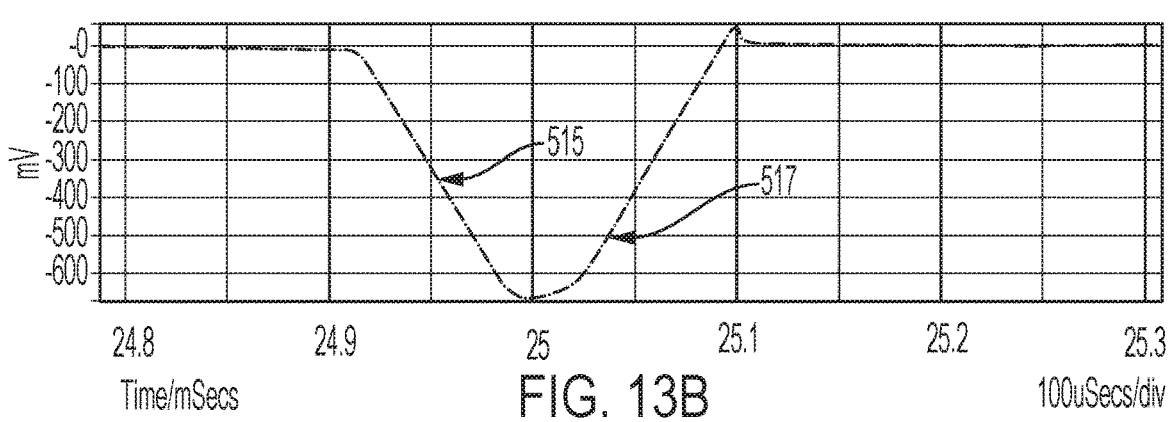
Figure 13C:
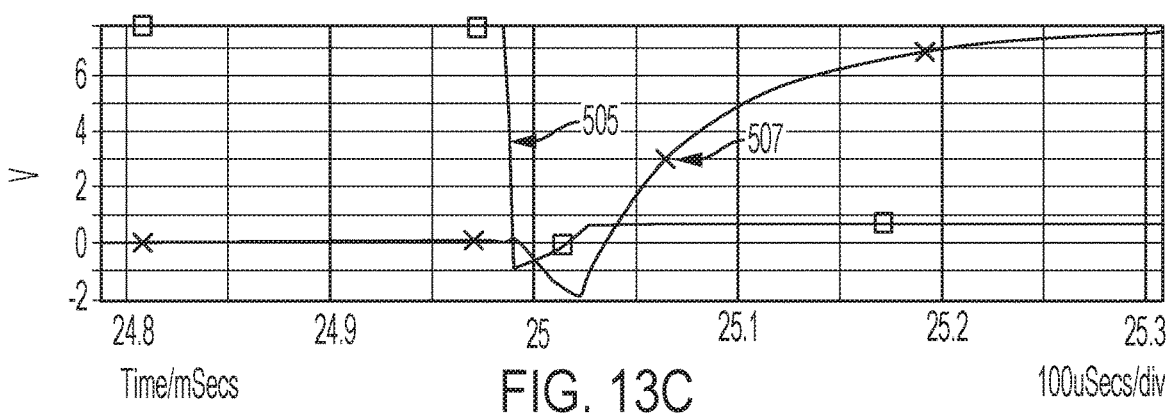
Figure 13D:
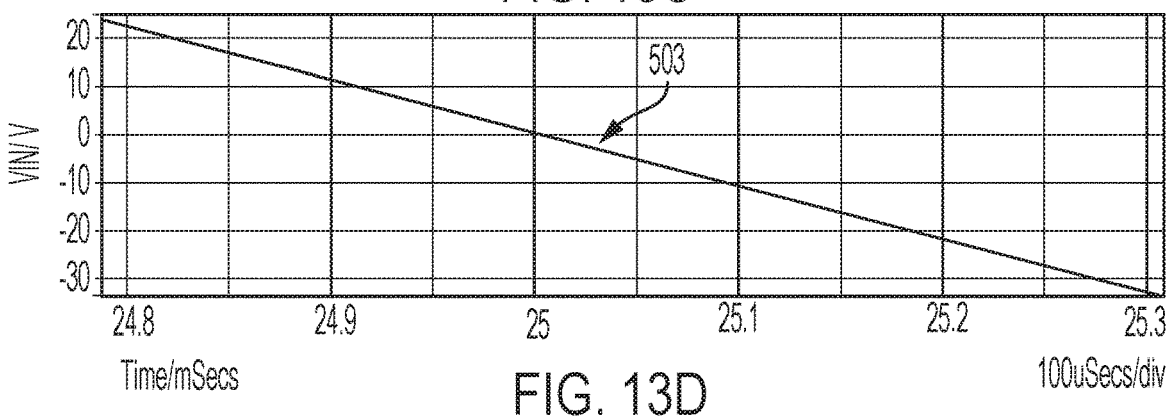

FIGS. 13A-13D illustrate example waveforms showing turn on and turn off of the transistors Q1, Q4, 580 and 582, and the MOSFETs Q2 and Q3, at the zero-crossing of the input voltage 503. Specifically, FIG. 13D illustrates a zero-crossing of the input voltage 503 as the input voltage is decreasing.

FIG. 13A illustrates a base-emitter voltage 511 of the transistor Q1, and a base-emitter voltage 513 of the transistor Q4, with a dead time between turn on of the transistor Q1 and turn off of the transistor Q4. FIG. 13B illustrates a base-emitter voltage 515 of the transistor 580 and a base-emitter voltage 517 of the transistor 582, with a dead time between turn on of the transistor 580 and turn off of the transistor 582. FIG. 9C illustrates a gate-source voltage 505 of the MOSFET Q2 and a gate-source voltage 507 of the MOSFET Q3, with a dead time between turn on of the MOSFET Q3 and turn off of the MOSFET Q2.

As shown in FIGS. 13A-13D, the MOSFET Q2 and the MOSFET Q3 are turned on during opposite half-cycles of the input voltage 503. Specifically, the MOSFET Q2 is turned on during positive half-cycles of the input voltage 503 while the transistor Q1 is turned off and the transistor 580 is turned on, and the MOSFET Q3 is turned on during negative half-cycles of the input voltage 503 while the transistor Q4 is turned off and the transistor 582 is turned on.

FIGS. 14A-14D illustrate example waveforms showing turn on and turn off of the transistors Q1, Q4, 580 and 582, and the MOSFETs Q2 and Q3, at the zero-crossing of the input voltage 503 as the input voltage 503 is increasing.

Figure 14A:
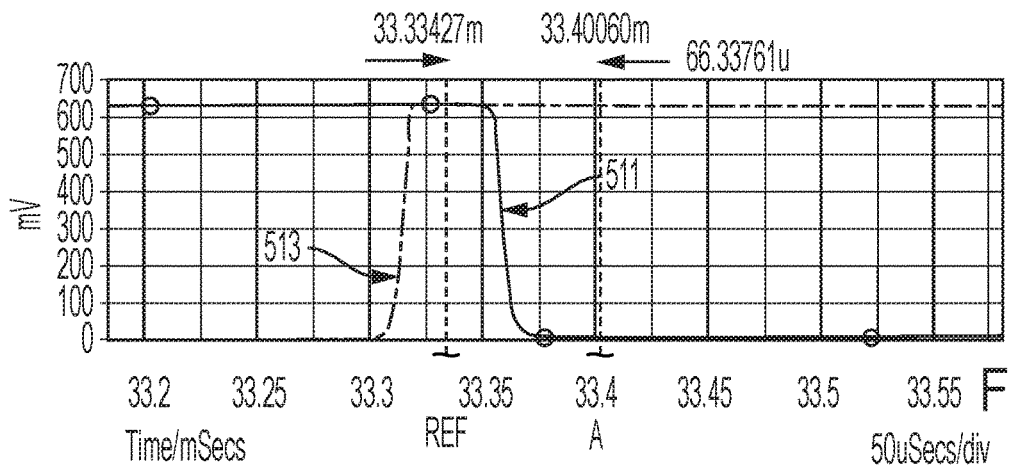
FIGS. 14A-14D are line graphs illustrating example voltage waveforms during a zero-crossing of the input voltage in a positive direction for the rectifier circuit of FIG. 12.
Figure 14B:
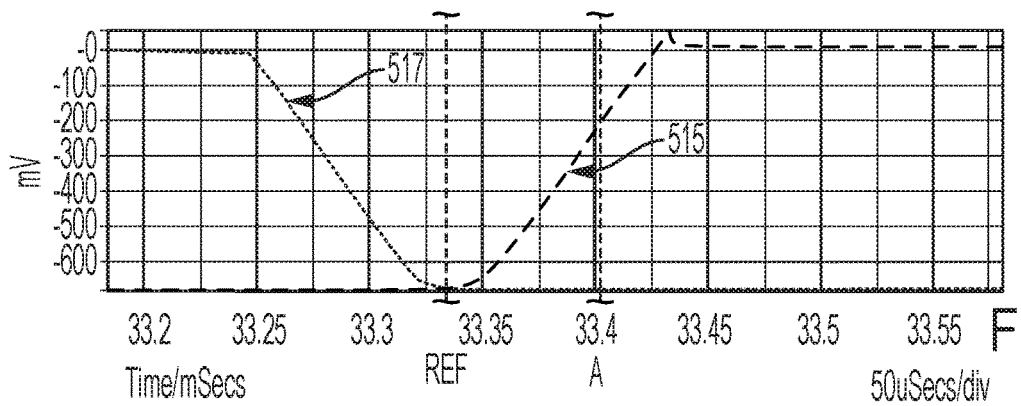
Figure 14C:
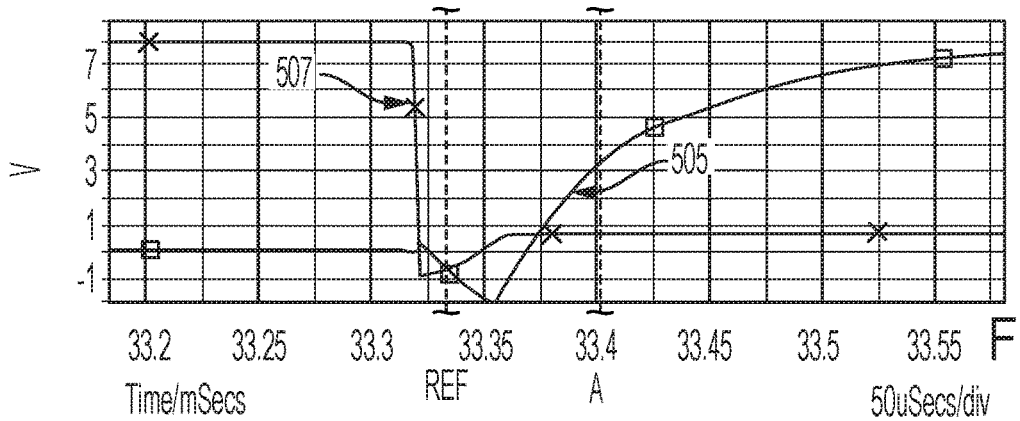
Figure 14D:
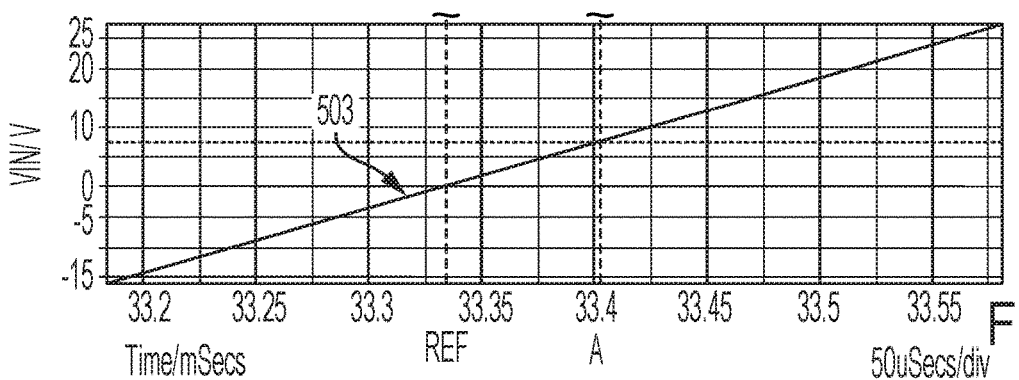

FIG. 14A illustrates a base-emitter voltage 511 of the transistor Q1, and a base-emitter voltage 513 of the transistor Q4, with a dead time between turn on of the transistor Q4 and turn off of the transistor Q1. FIG. 13B illustrates a base-emitter voltage 515 of the transistor 580 and a base-emitter voltage 517 of the transistor 582, with a dead time between turn on of the transistor 582 and turn off of the transistor 580. FIG. 9C illustrates a gate-source voltage 505 of the MOSFET Q2 and a gate-source voltage 507 of the MOSFET Q3, with a dead time between turn on of the MOSFET Q2 and turn off of the MOSFET Q3.

As described herein, example power supplies may include a microprocessor, microcontroller, integrated circuit, digital signal processor, etc., which may include memory. The power supplies may be configured to perform (e.g., operable to perform, etc.) any of the example processes described herein using any suitable hardware and/or software implementation. For example, the power supplies may execute computer-executable instructions stored in a memory, may include one or more logic gates, control circuitry, etc.

According to another example embodiment, a rectifier circuit for a power supply includes a line input and a neutral input for receiving an AC input voltage, and a diode bridge coupled between the line input and the neutral input for outputting a rectified voltage. The diode bridge includes multiple diodes. The rectifier circuit also includes a metal-oxide-semiconductor field-effect transistor (MOSFET) coupled in parallel with a first one of the multiple diodes, with the MOSFET including a gate. The rectifier circuit further includes a self-driven driver circuit coupled between a gate of the MOSFET and the line input or the neutral input, for controlling switching operation of the MOSFET during a half-cycle of the AC input voltage according to a line frequency and polarity of the AC input voltage, to operate the MOSFET as a high-side floating synchronous rectifier, the self-driven driver circuit including a transistor coupled between the gate of the MOSFET and the line input, the neutral input or an electrical ground.

According to yet another example embodiment, a method of supplying power via a rectifier circuit of a power supply is disclosed. The rectifier circuit includes a line input and a neutral input for receiving an AC input voltage, and a diode bridge coupled to the line input and the neutral input. The diode bridge includes multiple diodes. The rectifier circuit also includes a first metal-oxide-semiconductor field-effect transistor (MOSFET) coupled in parallel with a first one of the four diodes, a second MOSFET coupled in parallel with a second one of the four diodes, and a self-driven driver circuit coupled between the line input and a gate of the first MOSFET, and between the neutral input and a gate of the second MOSFET.

The method includes controlling, by the self-driven driver circuit, switching operation of the first MOSFET during a first half-cycle of the AC input voltage according to a line frequency and polarity of the AC input voltage, to operate the first MOSFET as a high-side floating synchronous rectifier. The method also includes controlling, by the self-driven driver circuit, switching operation of the second MOSFET during another half-cycle of the AC input voltage according to the line frequency and polarity of the AC input voltage, to operate the second MOSFET as a high-side floating synchronous rectifier.

Example embodiments described herein may be used in any suitable power supplies, such as a switched-mode power supply (SMPS), a linear converter, an AC/DC converter, a power supply including a front end PFC configuration, a totem-pole converter, a bridgeless converter, DC-DC converters, battery chargers, plating power supplies, power inverters, a low-loss auto polarity corrector for a DC input, a bridge arrangement driver circuit for line frequency inverters such as quasi-square (e.g., about 47 Hz to about 400 Hz), etc.

Example embodiments described herein may allow for reliable advanced detection of input voltage polarity changes with respect to a floating source of a MOSFET, even though the circuit may be floating with respect to a common electrical ground node. The circuits may not require direct input voltage sensing by use of a bridge arrangement and measuring voltage of a boot strap diode to generate a bootstrap voltage for generation of a gate drive signal. Example voltage biasing networks may allow for precise voltage threshold control for turn on of transistors, MOSFETs, etc. In some embodiments, separate voltage supply nodes may be used for different high side circuits, so a common VCC is not required for two high side circuits. In some embodiments, a rectifier circuit may not be suitable for a DC power supply where a bridge rectifier is followed by a large capacitor circuit arrangement to generate a filtered DC output.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A rectifier circuit for a power supply, the rectifier circuit comprising:
   a line input and a neutral input for receiving an AC input voltage;
   a diode bridge coupled between the line input and the neutral input for outputting a rectified voltage, the diode bridge including multiple diodes;
   a first metal-oxide-semiconductor field-effect transistor (MOSFET) coupled in parallel with a first one of the multiple diodes, the first MOSFET including a gate;
   a second MOSFET coupled in parallel with a second one of the multiple diodes, the second MOSFET including a gate; and
   a self-driven driver circuit coupled between the line input and the gate of the first MOSFET, and between the neutral input and the gate of the second MOSFET, for controlling switching operation of the first MOSFET and the second MOSFET during corresponding half-cycles of the AC input voltage according to a line frequency and polarity of the AC input voltage, to operate the first MOSFET and the second MOSFET as high-side floating synchronous rectifiers.

2. The rectifier circuit of claim 1, wherein the self-driven driver circuit includes a first transistor coupled between the neutral input and the gate of first MOSFET to control switching operation of the first MOSFET, and a second transistor coupled between the neutral input and the gate of second MOSFET to control switching operation of the second MOSFET.

3. The rectifier circuit of claim 2, wherein the self-driven driver circuit includes:
   a first voltage divider coupled between the line input and a voltage supply node, the first voltage divider including at least two resistors, and a first node between the at least two resistors operably coupled to the a gate or base of the first transistor for controlling switching operation of the first transistor; and
   a second voltage divider coupled between the neutral input and the voltage supply node, the second voltage divider including at least two resistors, and a second node between the at least two resistors of the second voltage divider operably coupled to a gate or base gate of the second transistor for controlling switching operation of the second transistor.

4. The rectifier circuit of claim 3, wherein the self-driven driver circuit includes diodes coupled between the voltage supply node and the first voltage divider, and between the voltage supply node and the second voltage divider, for supplying a bootstrap bias.

5. The rectifier circuit of claim 3, wherein the self-driven driver circuit includes:

a first bias circuit coupled between the line input and the voltage supply node, the first bias circuit including a first capacitor, a first resistor and a first diode; and a second bias circuit coupled between the neutral input and the voltage supply node, the second bias circuit including a second capacitor, a second resistor and a second diode.

6. The rectifier circuit of claim 3, further comprising a capacitor coupled between the voltage supply node and at least two of the multiple diodes of the diode bridge for decoupling the voltage supply node.

7. The rectifier circuit of claim 2, further comprising at least one resistor coupled between the line input and the neutral input for sensing the AC input voltage.

8. The rectifier circuit of claim 7, wherein the self-driven rectifier circuit includes:

a second resistor coupled between said at least one resistor and a voltage supply node, a first node between the second resistor and said at least one resistor operably coupled to a gate or base of the first transistor for controlling switching operation of the first transistor; and a third resistor coupled between said at least one resistor and the voltage supply node, a second node between the third resistor and said at least one resistor operably coupled to a gate or base of the second transistor for controlling switching operation of the second transistor.

9. The rectifier circuit of claim 8, wherein the self-driven rectifier circuit includes a second resistor coupled between the first node and the first transistor resistor for controlling a gate impedance, and a third resistor coupled between the second node and the second transistor resistor for controlling a gate impedance.

10. The rectifier circuit of claim 8, wherein the self-driven rectifier circuit includes a second resistor coupled between the voltage supply node and the gate of the first MOSFET for supplying a voltage bias, and a third resistor coupled between the voltage supply node and the gate of the second MOSFET for supplying a voltage bias.

11. The rectifier circuit of claim 7, further comprising at least two diodes coupled between the line input and the neutral input for providing a voltage clamp.

12. The rectifier circuit of claim 1, wherein:

the first diode one of the multiple diodes is coupled between the line input and a positive rectified voltage output;

the second one of the multiple diodes is coupled between the neutral input and the positive rectified voltage output;

a third one of the multiple diodes is coupled between the line input and an electrical ground; and a fourth one of the multiple diodes is coupled between the neutral input and the electrical ground.

13. A rectifier circuit for a power supply, the rectifier circuit comprising:

a line input and a neutral input for receiving an AC input voltage;

a diode bridge coupled between the line input and the neutral input for outputting a rectified voltage, the diode bridge including multiple diodes;

a metal-oxide-semiconductor field-effect transistor (MOSFET) coupled in parallel with a first one of the multiple diodes, the MOSFET including a gate; and a self-driven driver circuit coupled between a gate of the MOSFET and the line input or the neutral input, for controlling switching operation of the MOSFET during a half-cycle of the AC input voltage according to a line frequency and polarity of the AC input voltage, to operate the MOSFET as a high-side floating synchronous rectifier, the self-driven driver circuit including a transistor coupled between the gate of the MOSFET and the line input, the neutral input or an electrical ground.

14. The rectifier circuit of claim 13, wherein:

the MOSFET is a first MOSFET;

the rectifier circuit further comprises a second MOSFET coupled in parallel with a second one of the multiple diodes, the second MOSFET including a gate; and the self-driven driving circuit includes a second transistor coupled between the gate of the second MOSFET and the line input, the neutral input or the electrical ground, for controlling switching operation of the MOSFET during another half-cycle of the AC input voltage according to the line frequency and polarity of the AC input voltage, to operate the second MOSFET as a high-side floating synchronous rectifier.

15. The rectifier circuit of claim 14, wherein the self-driven driver circuit includes:

a third transistor coupled between a gate or base of the first transistor and the line input, the neural input, or a voltage supply node, for controlling switching operation of the first transistor; and a fourth transistor coupled between a gate or base of the second transistor and the line input, the neural input, or the voltage supply node, for controlling switching operation of the second transistor.

16. The rectifier circuit of claim 15, wherein the self-driven driver circuit includes:

a first voltage divider coupled between the line input and the voltage supply node, the first voltage divider including at least two resistors, a first node between the at least two resistors operably coupled to a gate or base of the third transistor for controlling switching operation of the third transistor; and a second voltage divider coupled between the neutral input and the voltage supply node, the second voltage divider including at least two resistors, a second node between the at least two resistors of the second voltage divider operably coupled to a gate or base of the fourth transistor for controlling switching operation of the fourth transistor.

17. The rectifier circuit of claim 13, wherein the self-driven driver circuit includes a diode coupled between the transistor and the line input or the neutral input for removing a base bias from the transistor.

18. The rectifier circuit of claim 13, wherein the self-driven driver circuit includes a bias circuit coupled between the transistor and a voltage supply node for controlling switching operation of the transistor, the bias network circuit includes at least three resistors, and the diode of the self-driven driver circuit is coupled between the bias circuit and the line input or the neutral input.

19. The rectifier circuit of claim 13, wherein the self-driven driver circuit includes:

a capacitor coupled between the gate of the MOSFET and the line input or the neutral input for controlling a timing of the switching operation of the MOSFET and the gate of the first MOSFET; and a resistor coupled between the gate of the MOSFET and the line input or the neutral input to control an impedance at the gate of the MOSFET.

20. The rectifier circuit of claim 13, wherein the self-driven driver circuit includes a resistor coupled between the transistor and the gate of the MOSFET for limiting a current to the gate of the MOSFET.

21. The rectifier circuit of claim 13, wherein the self-driven driver circuit includes a resistor coupled in parallel with the transistor for controlling a gate side impedance of the MOSFET.

22. A method of supplying power via a rectifier circuit of a power supply, the rectifier circuit including a line input and a neutral input for receiving an AC input voltage, a diode bridge coupled to the line input and the neutral input, the diode bridge including multiple diodes, a first metal-oxide-semiconductor field-effect transistor (MOSFET) coupled in parallel with a first one of the four diodes, a second MOSFET coupled in parallel with a second one of the four diodes, and a self-driven driver circuit coupled between the line input and a gate of the first MOSFET, and between the neutral input and a gate of the second MOSFET, the method comprising:

controlling, by the self-driven driver circuit, switching operation of the first MOSFET during a first half-cycle of the AC input voltage according to a line frequency and polarity of the AC input voltage, to operate the first MOSFET as a high-side floating synchronous rectifier; and controlling, by the self-driven driver circuit, switching operation of the second MOSFET during another half-cycle of the AC input voltage according to the line frequency and polarity of the AC input voltage, to operate the second MOSFET as a high-side floating synchronous rectifier.

23. The method of claim 22, wherein the rectifier circuit includes a third transistor coupled between the line input and the first transistor, and a fourth transistor coupled between the neutral input and the second transistor, the method further comprising:

controlling, by the third transistor, switching operation of the first transistor according to the line frequency and polarity of the AC input voltage; and controlling, by the fourth transistor, switching operation of the second transistor according to the line frequency and polarity of the AC input voltage.

\* \* \* \* \*